US008628101B2

(12) United States Patent
Koide et al.

(10) Patent No.: US 8,628,101 B2
(45) Date of Patent: Jan. 14, 2014

(54) SUSPENSION STRUCTURE, BUSH STRUCTURE AND SUSPENSION CHARACTERISTIC ADJUSTING METHOD

(75) Inventors: Reo Koide, Kawasaki (JP); Keiichi Nakajima, Atsugi (JP); Yoshihiro Kawabe, Kamakura (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 13/413,070

(22) Filed: Mar. 6, 2012

(65) Prior Publication Data
US 2012/0292872 A1    Nov. 22, 2012

(30) Foreign Application Priority Data

May 16, 2011 (JP) ................................ 2011-109664
May 16, 2011 (JP) ................................ 2011-109668

(51) Int. Cl.
*B60G 3/04* (2006.01)
*F16F 15/08* (2006.01)

(52) U.S. Cl.
USPC ........ 280/124.108; 280/124.13; 280/124.169; 280/124.153; 267/141; 267/141.2

(58) Field of Classification Search
USPC ..................... 280/124.153, 124.108, 124.109, 280/124.13, 124.135, 124.144, 124.169; 267/140.12, 141, 141.1, 141.3, 141.4, 267/293
See application file for complete search history.

(56) References Cited

U.S. PATENT DOCUMENTS

| | | | |
|---|---|---|---|
| 2,876,018 A | 3/1959 | Kishline et al. | |
| 4,139,246 A * | 2/1979 | Mikoshiba et al. | ........... 384/222 |
| 4,480,852 A | 11/1984 | Rumpel | |
| 4,491,429 A | 1/1985 | Matoba et al. | |
| 4,720,121 A | 1/1988 | Kikuchi et al. | |
| 4,984,928 A | 1/1991 | Domer | |

(Continued)

FOREIGN PATENT DOCUMENTS

| | | |
|---|---|---|
| DE | 43 02 410 A1 | 7/1993 |
| EP | 0 698 743 A2 | 2/1996 |

(Continued)

OTHER PUBLICATIONS

USPTO Office Action, U.S. Appl. No. 13/413,094, Dec. 27, 2012, 7 pages.

(Continued)

*Primary Examiner* — Ruth Ilan
*Assistant Examiner* — Darlene P Condra
(74) *Attorney, Agent, or Firm* — Foley & Lardner LLP

(57) ABSTRACT

A bush is adapted to connect a suspension link with a link support member which is one of a wheel support member and a vehicle body member. The bush includes an inner cylinder which extends in a front and rear direction and which is connected with one of the suspension link and the link support member, an outer cylinder which includes an inside circumferential surface confronting an outside circumferential surface of the inner cylinder and which is connected with the other of the suspension link and the link support member, and an elastic member interposed radially between the inner cylinder and the outer cylinder. The inner cylinder is formed with a bulge portion which projects radially outwards from the outside circumferential surface of the inner cylinder at a middle portion of the inner cylinder in an axial direction of the inner cylinder of the link bush.

18 Claims, 27 Drawing Sheets

(56) References Cited

U.S. PATENT DOCUMENTS

| | | | |
|---|---|---|---|
| 5,058,867 A * | 10/1991 | Hadano et al. | 267/141.3 |
| 5,439,244 A * | 8/1995 | Tomosada et al. | 280/124.139 |
| 5,620,261 A * | 4/1997 | Salz | 384/276 |
| 6,099,005 A | 8/2000 | Wakatsuki | |
| 6,817,599 B2 * | 11/2004 | Kato et al. | 267/141.2 |
| 7,017,890 B2 * | 3/2006 | Rechtien | 267/141.3 |
| 7,243,934 B2 | 7/2007 | Lee et al. | |
| 7,540,478 B2 | 6/2009 | De Fontenay et al. | |
| 7,789,406 B2 * | 9/2010 | Matsuoka | 280/124.135 |
| 7,866,640 B2 * | 1/2011 | Funano et al. | 267/293 |
| 8,056,912 B2 | 11/2011 | Kawabe et al. | |
| 8,087,682 B2 | 1/2012 | Natsukari et al. | |
| 8,205,900 B1 | 6/2012 | Moravy et al. | |
| 8,342,542 B2 | 1/2013 | Sagara et al. | |
| 2004/0108640 A1 | 6/2004 | Michael et al. | |
| 2007/0258671 A1 * | 11/2007 | Siemer et al. | 384/222 |
| 2008/0246243 A1 | 10/2008 | Matsuoka | |
| 2009/0289399 A1 | 11/2009 | Suzuki | |
| 2010/0001486 A1 | 1/2010 | Natsukari et al. | |
| 2010/0078911 A1 * | 4/2010 | Kawabe et al. | 280/124.144 |
| 2010/0201086 A1 | 8/2010 | Sagara et al. | |
| 2012/0292872 A1 | 11/2012 | Koide et al. | |
| 2012/0292873 A1 | 11/2012 | Koide et al. | |
| 2012/0292876 A1 | 11/2012 | Koide et al. | |

FOREIGN PATENT DOCUMENTS

| | | |
|---|---|---|
| FR | 2691767 A1 | 12/1993 |
| FR | 2863206 A1 | 6/2005 |
| JP | 01-166146 U | 11/1989 |
| JP | 07-246816 A | 9/1995 |
| JP | 09-315122 A | 12/1997 |
| JP | 2005-505734 A | 2/2005 |
| JP | 2008-095861 A | 4/2008 |
| JP | 2008-155702 A | 7/2008 |
| JP | 2008-247069 A | 10/2008 |
| JP | 2008-247182 A | 10/2008 |
| JP | 2008-254568 A | 10/2008 |
| JP | 2008-254569 A | 10/2008 |
| JP | 2008-254570 A | 10/2008 |
| JP | 2008-254571 A | 10/2008 |
| JP | 2008-273401 A | 11/2008 |
| JP | 2008-273402 A | 11/2008 |
| JP | 2009-6929 A | 1/2009 |
| JP | 2009-40292 A | 2/2009 |
| JP | 2009-126206 A | 6/2009 |
| JP | 2009-179250 A | 8/2009 |
| JP | 2009-214743 A | 9/2009 |
| WO | WO-2007/097070 A1 | 8/2007 |

OTHER PUBLICATIONS

U.S. Appl. No. 13/413,094, filed Mar. 6, 2012, Koide et al.
U.S. Appl. No. 13/412,903, filed Mar. 6, 2012, Koide et al.
U.S. Appl. No. 13/412,935, filed Mar. 6, 2012, Koide et al.
Machine translation of JP 2009-214743, 14 pages.
USPTO Office Action, U.S. Appl. No. 13/413,094, Jun. 21, 2013, 11 pages.
Japanese Office Action, Sep. 3, 2013, 4 pages.
USPTO Notice of Allowance, U.S. Appl. No. 13/413,094, Nov. 1, 2013, 8 pages.

* cited by examiner

VEHICLE LONGITUDINAL DIRECTION

A-A

VEHICLE LONGITUDINAL DIRECTION

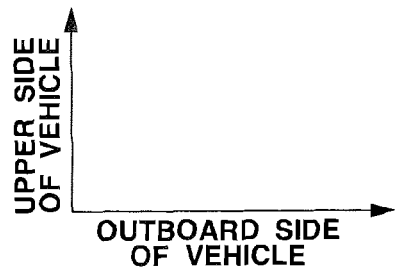

LONGITUDINAL RESONANCE MODE

TOE-IN DUE TO LONGITUDINAL FORCE

RESONANCE

DOTTED LINE: BEFORE RESONANCE DEFORMATION
SOLID LINE: AFTER RESONANCE DEFORMATION

INPUT OF LONGITUDINAL FORCE

DOTTED LINE: BEFORE APPLICATION OF LONGITUDINAL FORCE
SOLID LINE: AFTER APPLICATION OF LONGITUDINAL FORCE

BEFORE DEFORMATION

AFTER DEFORMATION

A-B

FIG.24A
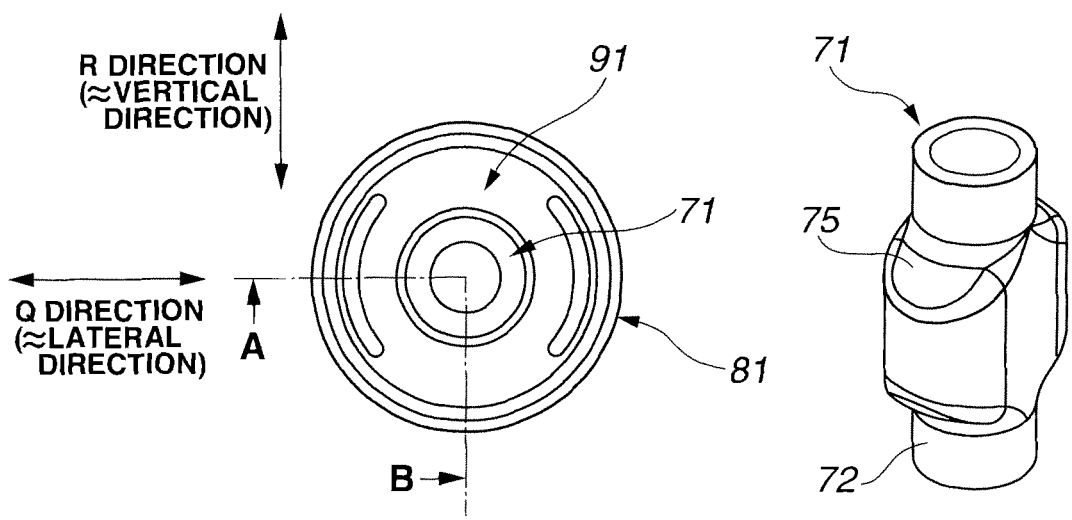
FIG.24C
FIG.24B
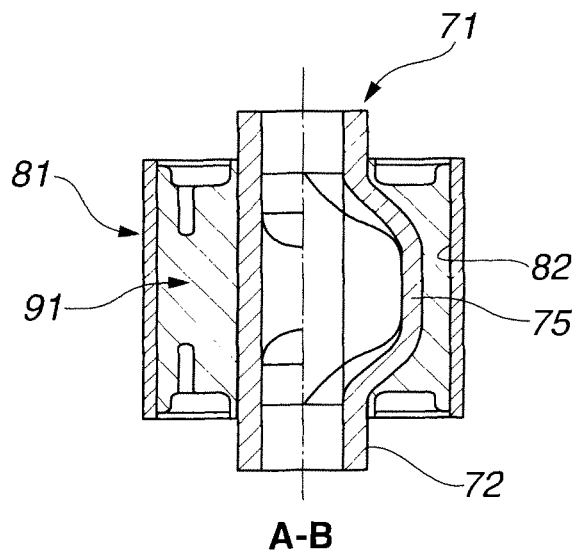
A-B

FIG. 25A
FIG. 25C
FIG. 25B
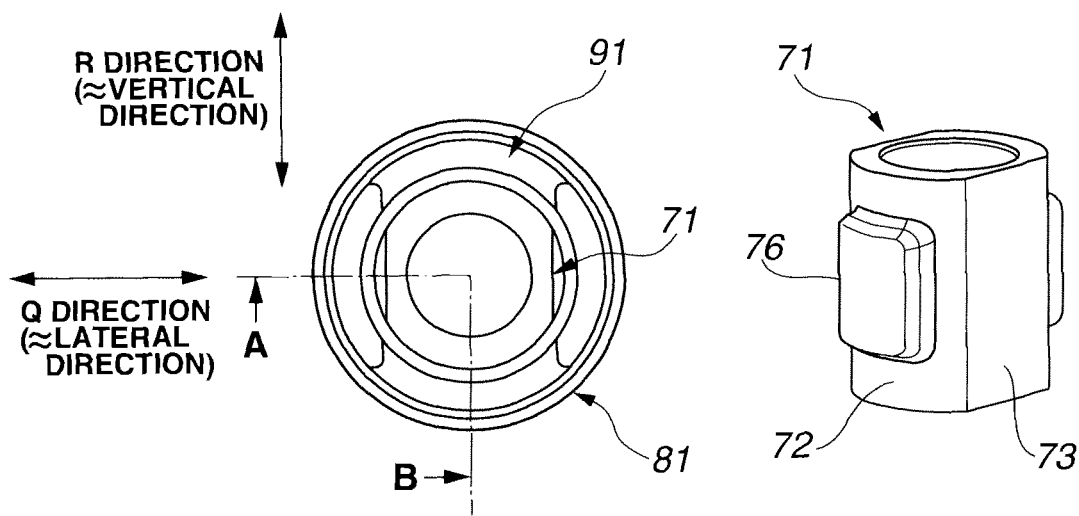
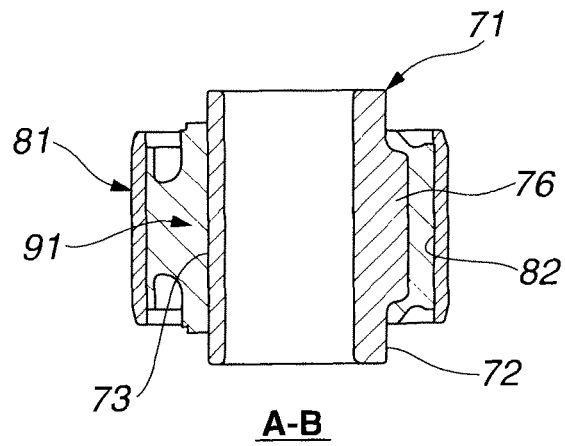

FIG.26A
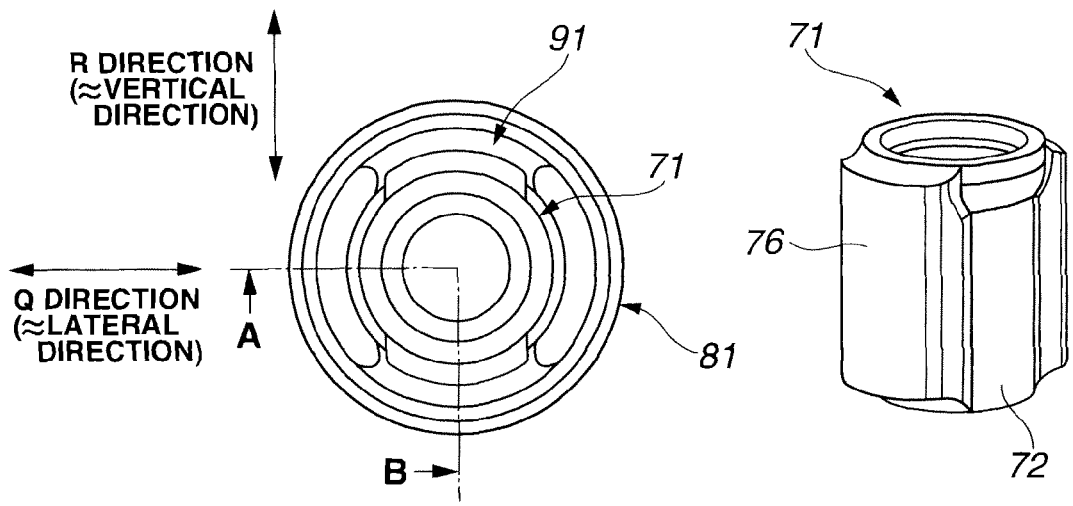
FIG.26C
FIG.26B
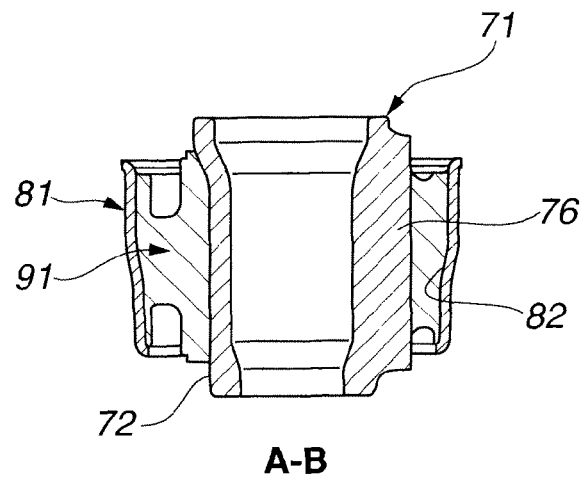
A-B

FIG.27A
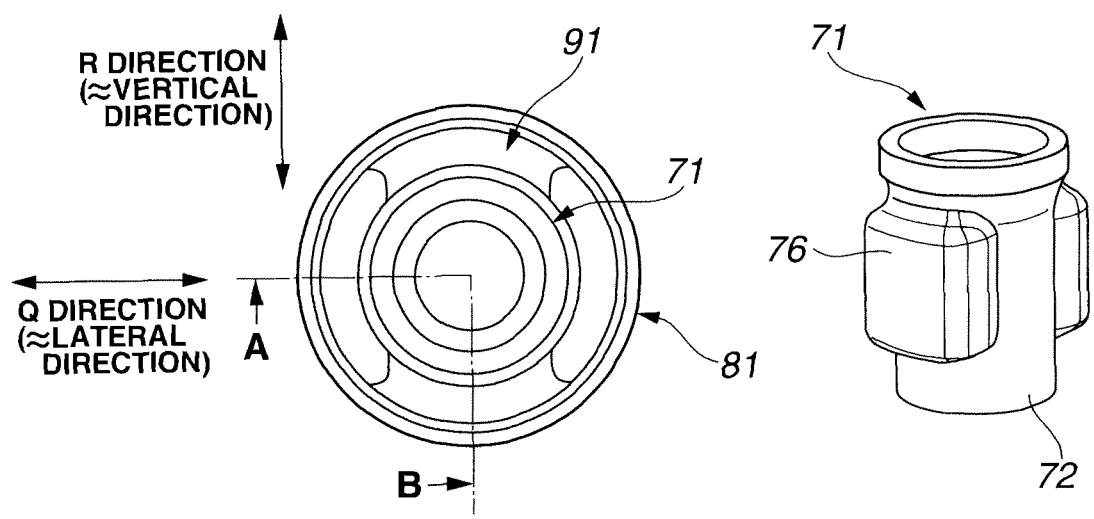
FIG.27C
FIG.27B
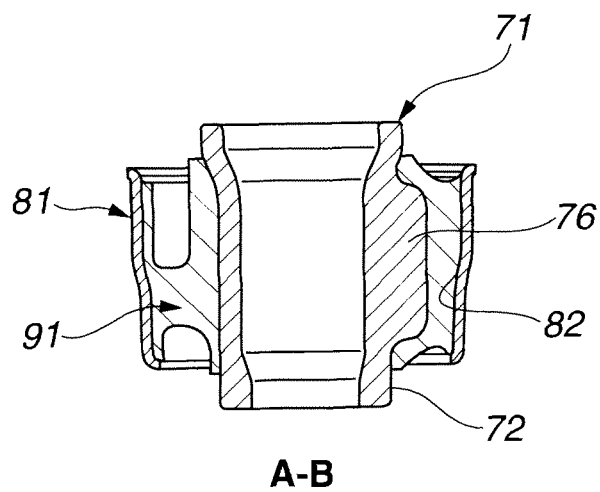
A-B

SUSPENSION STRUCTURE, BUSH STRUCTURE AND SUSPENSION CHARACTERISTIC ADJUSTING METHOD

BACKGROUND OF THE INVENTION

The present invention relates to suspension structure, bush structure and/or suspension characteristic adjusting method.

In a suspension system as shown in JP2008-247069A (≈US 2010/0078911A1), there is provided a bush at each of connection (or support) points between the front and rear links and the wheel and between the front and rear links and the vehicle body. The bush has a bush axis extending approximately in the vehicle longitudinal direction.

In the suspension system of the above-mentioned document), lower front and rear links are connected through a bush having a bush axis extending substantially in the vehicle longitudinal direction. In general, a rubber member between inner and outer cylinders of the bush may be formed with a hollow portion extending axially through the rubber member so as to provide directionality in the stiffness of the bush in the (radial) directions perpendicular to the axis around the axis.

SUMMARY OF THE INVENTION

In a suspension system in general, there exists a primary resonance frequency of about 15~20 Hz in the vehicle longitudinal direction. Therefore, it is conceivable to shift the resonance point to a higher frequency in the deformation mode of the bush in the axial direction in order to improve the sound and vibration performance. However, in the case of a bush having inner and outer cylinders in the form of straight cylindrical shape extending substantially in the vehicle longitudinal direction, it is difficult to increase the stiffness of the bush in the axial direction while decreasing the stiffness in a twisting direction, and hence it is difficult to shift the resonance point to the higher frequency side. Therefore, it is an object of the present invention to improve the sound and vibration performance.

The hollow portion passing axially through the rubber member may cause a sharp variation in the stiffness of the bush in directions perpendicular to the axis around the axis, between a region formed with the hollow portion and a region formed with no hollow portion, and hence may exert influence on the steering stability and steering feeling during a cornering operation. Therefore, it is another object of the present invention to improve the steering stability and steering feeling during a cornering operation.

According to one aspect of the present invention, to attain the object, there is provided a link bush to connect a suspension link with a link support member which is one of a wheel support member and a vehicle body member. The link bush includes an inner cylinder which is connected with one of the rear suspension link and the link support member, an outer cylinder which includes an inside circumferential surface confronting an outside circumferential surface of the inner cylinder of the link bush and which is connected with the other of the suspension link and the link support member, and an elastic member interposed between the inner cylinder and the outer cylinder of the link bush. A bulge portion projects radially outwards from the outside circumferential surface of the inner cylinder of the link bush at a middle portion of the inner cylinder in the axial direction of the inner cylinder of the link bush.

According to another aspect of the present invention, to attain the further object, there is provided a connect bush to connect a front suspension link and a rear suspension link with each other. The connect bush includes an inner cylinder which extends in an axial direction of the connect bush, from a rear end to a front end located on the front side of the rear end of the inner cylinder in a front and rear direction and which is connected with one of the front and rear suspension links, an outer cylinder which includes an inside circumferential surface confronting an outside circumferential surface of the inner cylinder and which is connected with the other of the front and rear suspension links, and an elastic member interposed between the inner cylinder and the outer cylinder. A radial thickness of the elastic member in a vertical direction (or first perpendicular direction) which is a direction perpendicular to the axial direction is made smaller than a radial thickness of the elastic member in a horizontal direction (or second perpendicular direction) which is a direction perpendicular to the axial direction and perpendicular to the vertical direction, by a convex portion projecting from one of the inside circumferential surface of the outer cylinder and the outside circumferential surface of the inner cylinder toward the other.

BRIEF DESCRIPTION OF THE DRAWINGS

FIG. 7 shows a link bush serving as an outboard connection point on the wheel's side.

FIG. 8 shows the link bush connected with an axle housing.

FIG. 9 shows a link bush serving as an inboard connection point on the vehicle body's side.

FIG. 10 shows a connect bush connecting the lower front and rear links.

FIG. 12 shows the connect bush connected with lower front link.

FIG. 14 shows the states of the suspension links at the time of resonance and input of a longitudinal force.

FIG. 16 shows the connecting structure between lower front link and lower rear link in the comparative example.

FIG. 20 shows a link state at the time of input of a longitudinal force.

FIG. 23 shows a first variation example of convex portions of the connect bush.

FIG. 24 shows a second variation example of the convex portions. FIG. 24A is top view of the connect bush, FIG. 24B is a longitudinal sectional view taken across a line A-B in FIG. 24A, and FIG. 24C is a perspective view of the inner cylinder.

FIG. 25 shows a third variation example of the convex portions. FIG. 25A is top view of the connect bush, FIG. 25B is a longitudinal sectional view taken across a line A-B in FIG. 25A, and FIG. 25C is a perspective view of the inner cylinder.

FIG. 26 shows a fourth variation example of the convex portions. FIG. 26A is top view of the connect bush, FIG. 26B is a longitudinal sectional view taken across a line A-B in FIG. 26A, and FIG. 26C is a perspective view of the inner cylinder.

FIG. 27 shows a fifth variation example of the convex portions. FIG. 27A is top view of the connect bush, FIG. 27B is a longitudinal sectional view taken across a line A-B in FIG. 27A, and FIG. 27C is a perspective view of the inner cylinder.

DETAILED DESCRIPTION OF THE INVENTION

The following is explanation on vehicles such as motor vehicles according to embodiments of the present invention, with reference to drawings.

Figure 1:
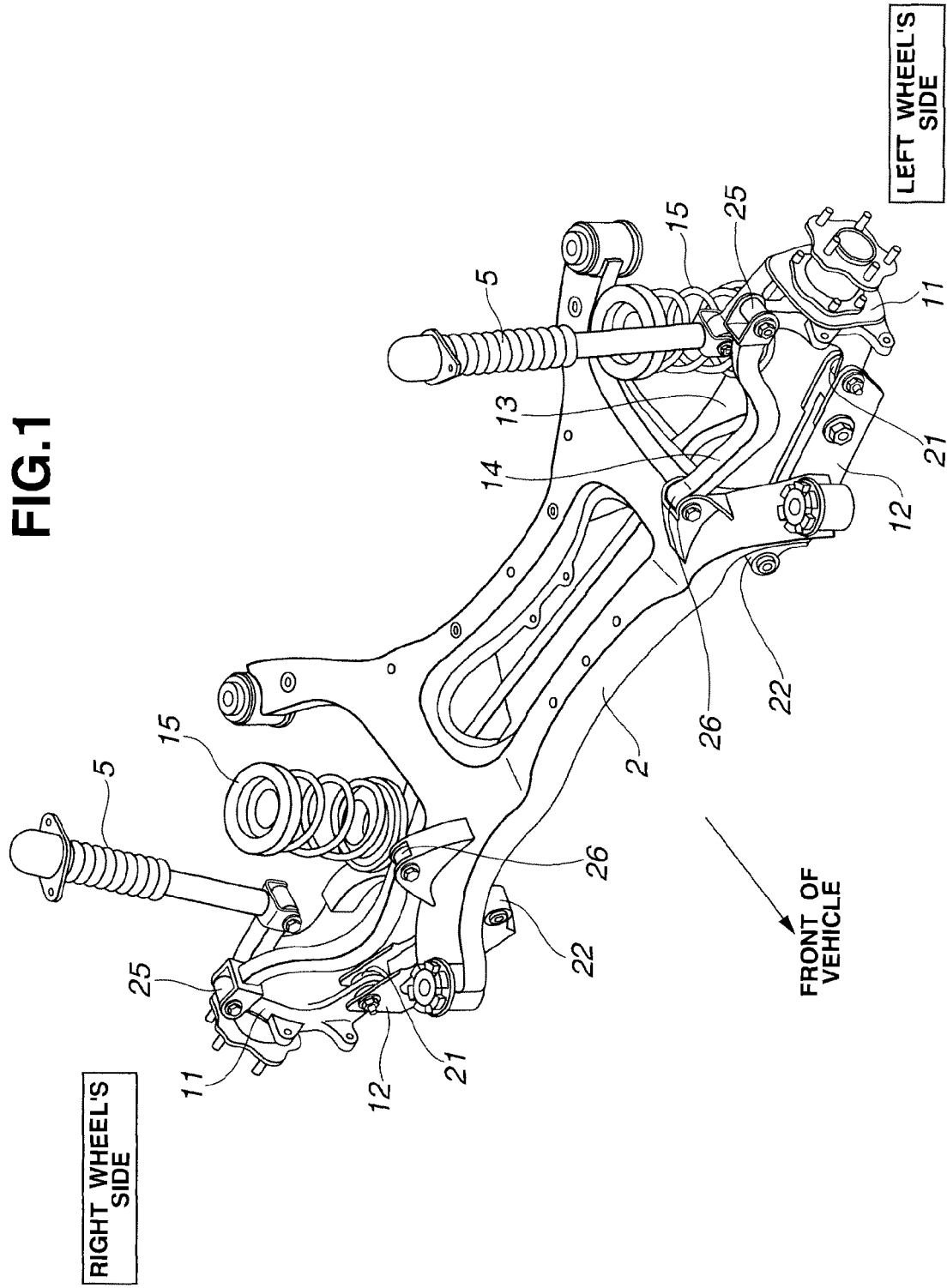
FIG. 1 is a perspective view schematically showing a rear wheel suspension system according to one embodiment of the present invention.
Figure 2:
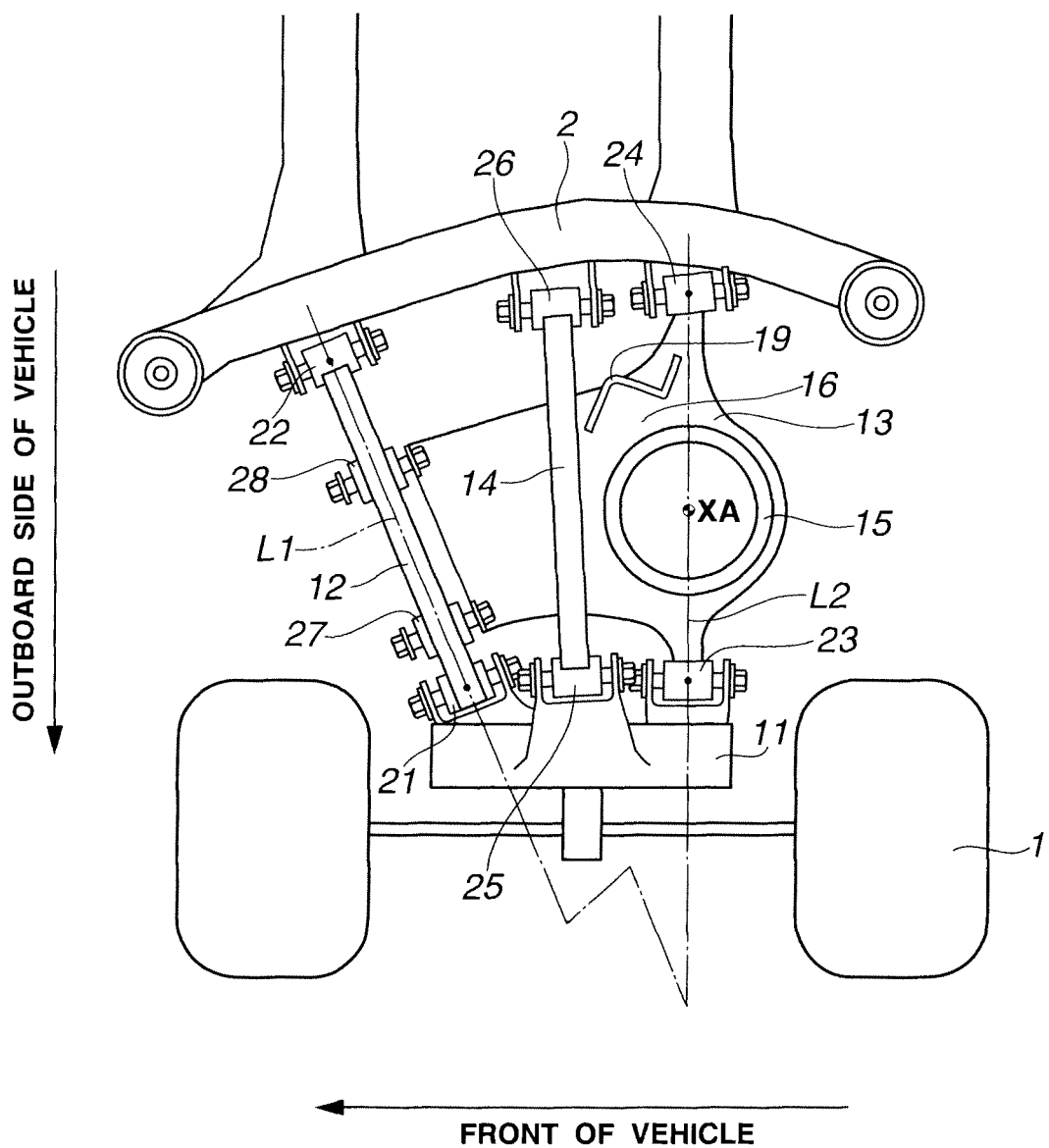
FIG. 2 is a top view schematically showing a rear left wheel suspension system.
Figure 3:
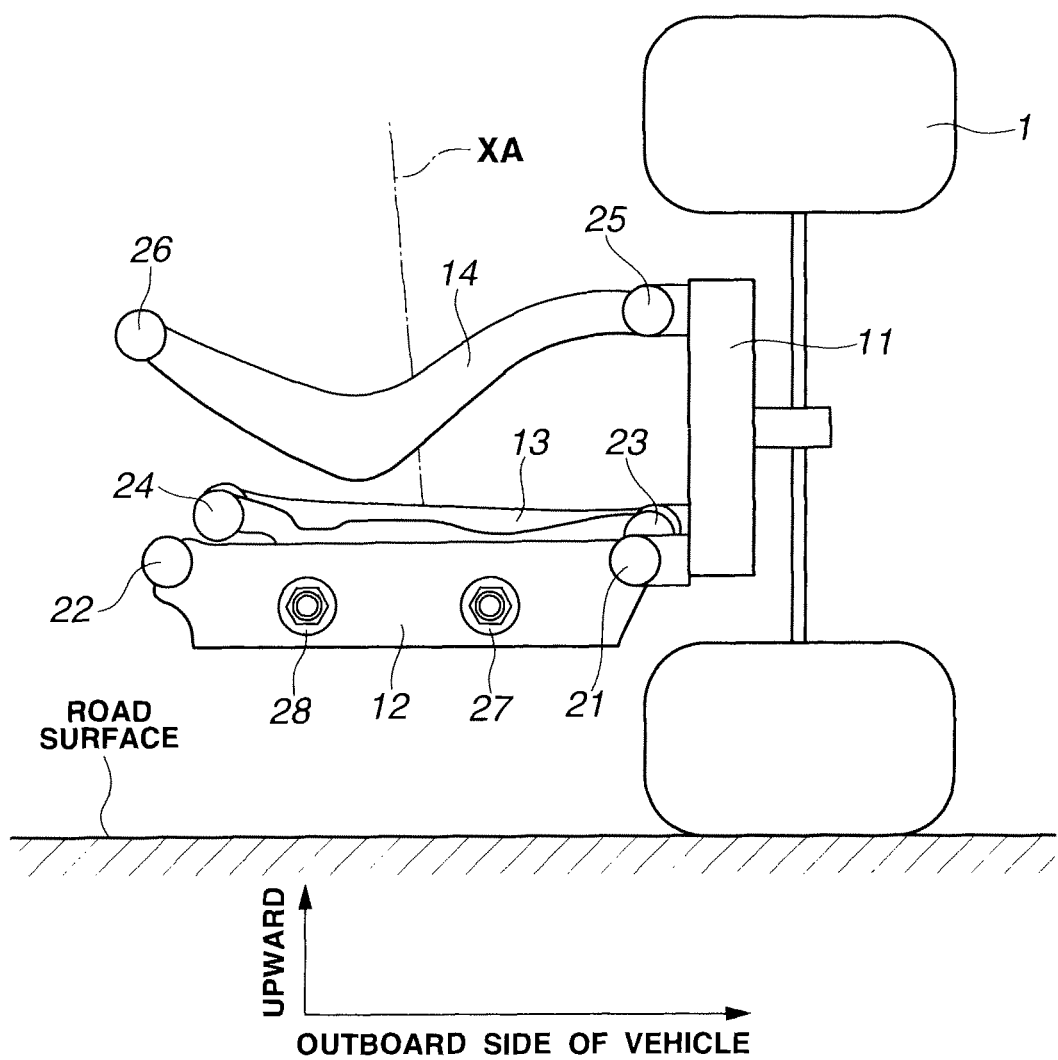
FIG. 3 is a front view schematically showing the rear left wheel suspension system.

FIG. 1 is a perspective view schematically showing a rear wheel suspension system in perspective. FIG. 2 is schematic top view schematically showing a rear left wheel suspension system. FIG. 3 is a schematic front view schematically showing the rear left wheel suspension system.

In the illustrated example of this embodiment, a rear left wheel independent suspension system or structure is taken as an example. The suspension system shown in FIGS. 2 and 3 connects a wheel 1 to a suspension member 2 (vehicle body member) of a vehicle body, and includes an axle housing 11 (hub carrier), a lower front link 12 (front suspension link), a lower rear link 13 (rear suspension link), an upper link 14, a coil spring 15 and a strut 5 (shown in FIG. 1). Axle housing 11 is a wheel support member supporting the wheel 1 rotatably.

The lower front and rear links 12 and 13 are arranged in a front and rear direction (of the suspension system) corresponding to the vehicle longitudinal direction, at approximately equal heights (in the vertical, or up and down, direction corresponding to the vehicle vertical direction). Lower front link 12 extends substantially or approximately in a transverse direction (corresponding to the vehicle widthwise or lateral direction) from an outboard end (on the outboard side remoter from the center line of the vehicle) to an inboard end (on the inboard side closer to the vehicle center line). The outboard end of lower front link 12 is connected, through a bush 21 (front outboard link bush), swingably with a lower front portion of the axle housing 11. The inboard end of lower front link 12 is connected, through a bush 22 (front inboard link bush), swingably with a lower front portion of the suspension member 2. In the plan view (as shown in FIG. 2), the connection point on the outboard side (the position of bush 21) is located slightly on the rear side of the connection point on the inboard side (the position of bush 22) in the front and rear direction or in the vehicle longitudinal direction.

Lower rear link 13 extends substantially in the transverse direction (corresponding to the vehicle lateral direction) from an outboard end (on the outboard side) to an inboard end (on the inboard side). The outboard end of lower rear link 13 is connected through a bush 23 (rear outboard link bush) swingably with a lower rear portion of the axle housing 11. The inboard end of lower rear link 13 is connected through a bush 24 (rear inboard link bush) swingably with a lower rear portion of the suspension member 2. In the plan view (as shown in FIG. 2), the connection point on the outboard side (the position of bush 23) and the connection point on the inboard side (the position of bush 24) are located approximately at the same position in the front and rear direction corresponding to the vehicle longitudinal direction.

The distance between the front outboard connection point (the position of bush 21) of lower front link 12 and the rear outboard connection point (the position of bush 23) of lower rear link 13 with respect to axle housing 11 is smaller than the distance between the front inboard connection point (the position of bush 22) of lower front link 12 and the rear inboard connection point (the position of bush 24) of lower rear link 13 with respect to suspension member 2. Therefore, the straight line L1 (the axis or center line of lower front link 12) connecting the positions of outboard bush 21 and inboard bush 22 of lower front link 12 and the straight line L2 (the axis or center line of lower rear link 13) connecting the positions of outboard bush 23 and inboard bush 24 of lower rear link 13 intersect with each other at an intersection point located on the outboard side of the links 12 and 13 (or on the outboard side of the axle housing 11 or the wheel 1). As shown in FIG. 2, the lower rear link 13 extends in the transverse direction or in the vehicle widthwise or lateral direction whereas the lower front link 12 extends obliquely so that the distance or spacing between the lower front and rear links 12 and 13 in the front and rear direction or the vehicle longitudinal direction becomes gradually smaller in the outboard direction from the inboard ends to the outboard ends of lower front and rear links 12 and 13.

Upper link 14 extends substantially in the transverse direction corresponding to the vehicle widthwise or lateral direction, from an outboard end (on the outboard side) to an inboard end (on the inboard side) above the level of the lower front and rear links 12 and 13. The outboard end of upper link 14 is connected through a bush 25 (upper outboard link bush) swingably with an upper portion of the axle housing 11. The inboard end of upper link 14 is connected through a bush 26 (upper inboard link bush) swingably with an upper portion of the suspension member 2.

Each of the (link) bushes 21~26 includes an outer cylinder or tube, an inner cylinder or tube nested or inserted in the outer cylinder, and an elastic member made of resilient or elastic material such as rubber interposed radially between the outer and inner cylinders. In this example, all the bushes 21~26 for the lower front link 12, lower rear link 13 and upper link 14 are arranged so that the outer cylinder of each bush is connected with the corresponding end of the link 12, 13 or 14 and the inner cylinder of each bush is connected with the axle housing 11 or suspension member 2.

Lower rear link 13 includes a projecting (plate-like) portion 16 (wing portion) projecting toward the lower front link 12. Projecting portion 16 is an integral part of lower rear link 13. Projecting portion 13 projects forwards in the front and rear direction corresponding to the vehicle longitudinal direction (from the axis L2) to a front end. The front end of projecting portion 13 is connected with the lower front link 12 through at least one connect bush allowing predetermined relative displacement. In this example, the front end of projecting portion 13 is connected with the lower front link 12 through connect bushes 27 and 28 allowing predetermined relative displacement. The connect bushes 27 and 28 are arranged along lower front link 12. Each of connect bushes 27 and 28 includes an outer cylinder or tube, an inner cylinder or tube nested or inserted in the outer cylinder, and an elastic member made of resilient or elastic material such as rubber interposed radially between the outer and inner cylinders. In this example, the connect bushes 27 and 28 are arranged so that the axis of the bush extends substantially in the front and rear direction corresponding to the vehicle longitudinal direction, and the outer cylinder of each bush is connected with the lower front link 12 and the inner cylinder of each bush is connected with the projecting portion 16 of lower rear link 13.

The lower rear link 13 including the projecting portion 16 is capable of displacing relative to lower front link 12 within a movable range (deflection range) of the connect bushes 27 and 28. In this embodiment, each of the connect bushes 27 and 28 is anisotropic in stiffness or rigidity so that the stiffness in the transverse direction (or in the vehicle lateral direction) is lower than the stiffness in the vertical direction. Connect bushes 27 and 28 will be explained more in detail later.

A toe control is performed at the time of braking in a following manner.

When a rearward force toward the rear of the vehicle body is inputted to wheel 1 by a braking operation or other factors, the axle housing 11 is displaced rearwards to the rear of the vehicle body. In this case, a rearward displacement quantity of the connection point (bush 21) of lower front link 12 with respect to axle housing 11 and a rearward displacement quantity of the connection point (bush 23) of lower rear link 13 with respect to axle housing 11 are substantially equal to each other. However, in the nonparallel arrangement or geometry of straight lines L1 and L2 as mentioned before, an inboard displacement quantity of the connection point (bush 21) of lower front link 12 is greater than an inboard displacement quantity of the connection point (bush 23) of lower rear link 13 in the inboard lateral (or vehicle widthwise) direction toward the center line (longitudinal axis) of the vehicle body. Thus, the front connection point (bush 21) of axle housing 11 is pulled inwards in the inboard lateral direction toward the center line of the vehicle body, and hence a toe change is produced in wheel 1 during braking, in a direction to increase the quantity of toe-in, to the advantage of the stability.

The coil spring 15 is arranged in a following manner. Coil spring 15 is disposed between lower rear link 13 and the vehicle body so that a coil axis XA is substantially vertical in the vertical direction. Coil spring 15 is located so as to overlap the straight line L2 as viewed in the plan view. Preferably, the coil axis XA is located on straight line L2 as shown in FIG. 2, or the coil axis XA intersects the straight line L2. In this example, the coil spring 15 is mounted on lower rear link 13 at a middle or about the middle between the rear outboard connection point (bush 23) and the rear inboard connection point (bush 24). A seating surface of coil spring 15 extends and overlaps the projecting portion 16 of lower rear link 13. Lower rear link 13 includes a rear portion projects rearwards so as to conform with the outside diameter of coil spring 15.

Figure 4:
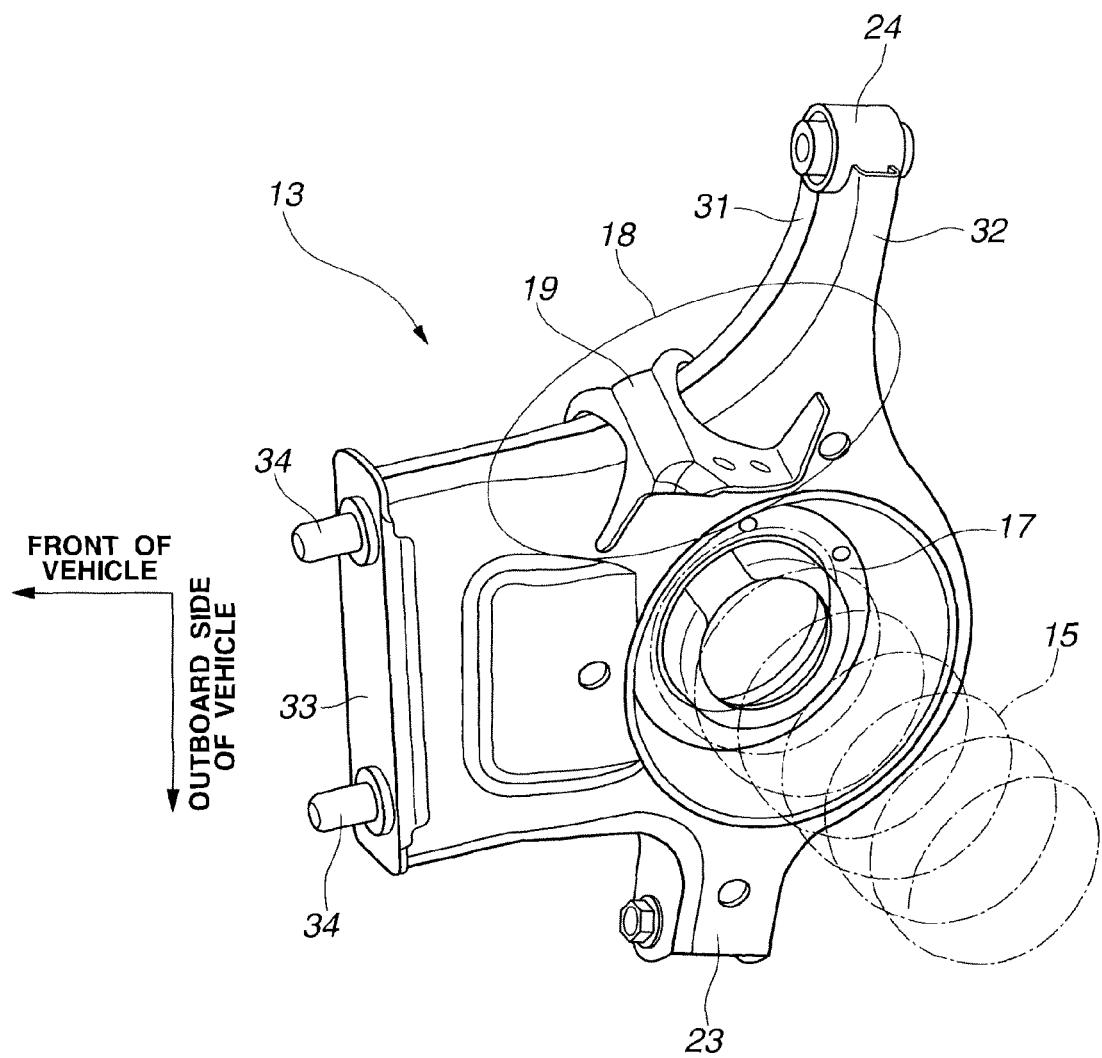
FIG. 4 is an external view of a lower rear link shown in FIG. 2.
Figure 5:
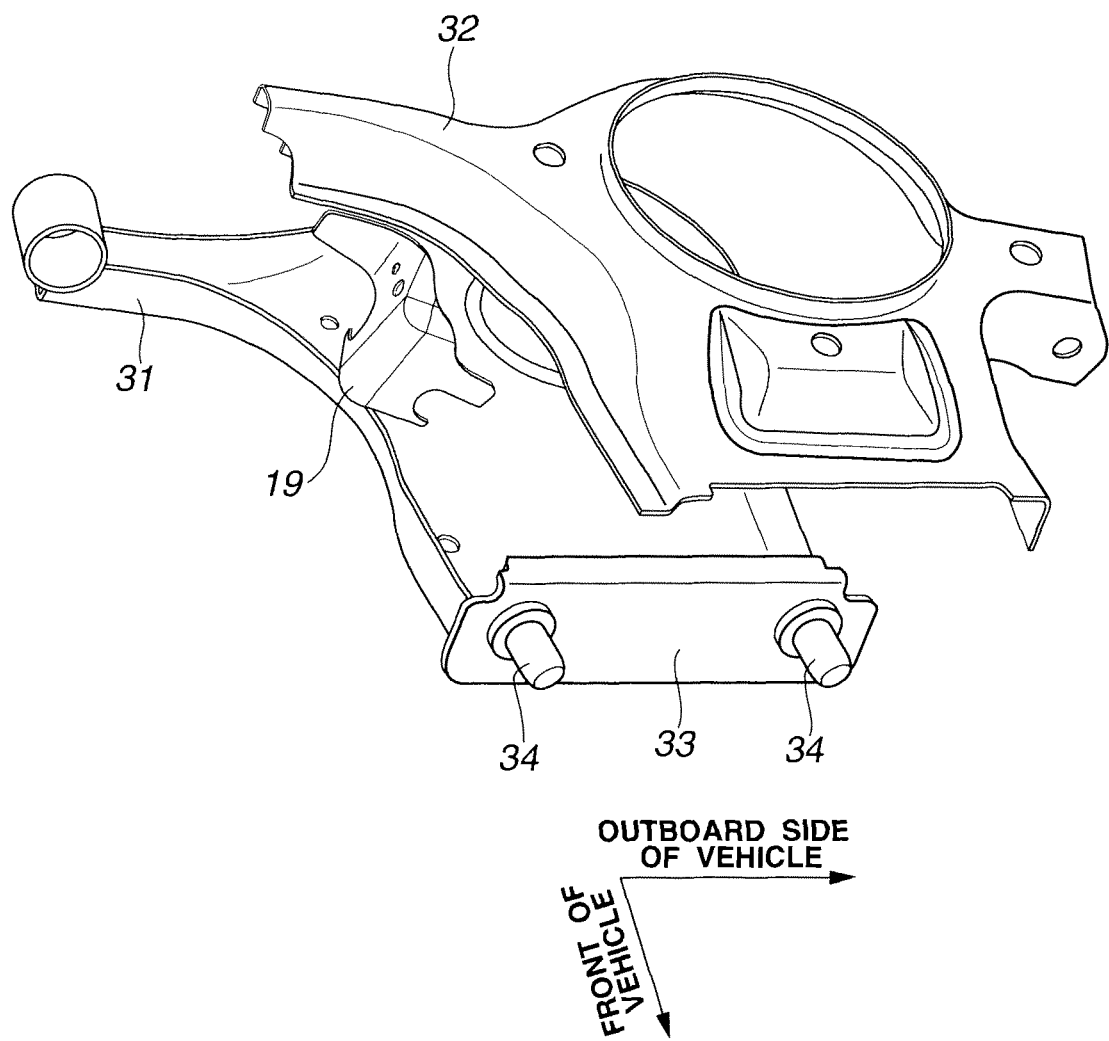
FIG. 5 is an exploded view of the lower rear link.

Coil spring 15 is connected with lower rear link 13 in a following manner. FIG. 4 is an external view of the lower rear link 13, for showing an assembly structure of lower rear link 13 and coil spring 15. FIG. 5 is an exploded view of the lower rear link 13. A lower spring seat 17 is interposed between the lower end of coil spring 15 and lower rear link 13. The lower spring seat 17 having an annular shape is installed in the lower rear link 13, and the lower end of coil spring 15 is attached to this lower spring seat 17.

Lower rear link 13 has a hollow structure made up of a lower bracket 31 and an upper bracket 32 which are shaped in a recessed form like a dish or a pan, and which are joined so that the concave sides of the lower and upper brackets 31 and 32 confront each other. Lower and upper brackets 31 and 32 are joined together and united by arc welding.

Lower rear link 13 includes a front bracket 33 shaped like a plate and arranged to serve as a connection surface confronting the lower front link 12. The front bracket 33 extends in the transverse direction corresponding to the vehicle lateral or widthwise direction. Front bracket 33 covers and closes the front ends of lower and upper brackets 31 and 32. Connection pins 34 are fixed to the front bracket 33 and arranged to support the connect bushes 27 and 28, respectively, as mentioned later.

A curved portion 18 is formed in lower rear link 13. Curved portion 18 is a portion where the cross sectional area is varied sharply from the connection point (bush 24) with suspension member 2, to the inboard connection point (bush 28) with lower front link 12. A reinforcing bracket 19 is attached to the curved portion 18. Reinforcing bracket 19 is arranged to straddle and hold (or clamp) the lower bracket 31 and upper bracket 32. Lower rear link 13 and reinforcing bracket 19 are joined together and united by arc welding.

Lower spring seat 17 is disposed on a concave surface (inside bottom surface) of lower bracket 31. Coil spring 15 extends from the lower end attached to this lower spring seat 17, through an opening formed in upper bracket 32, and projects upwards.

Figure 6:
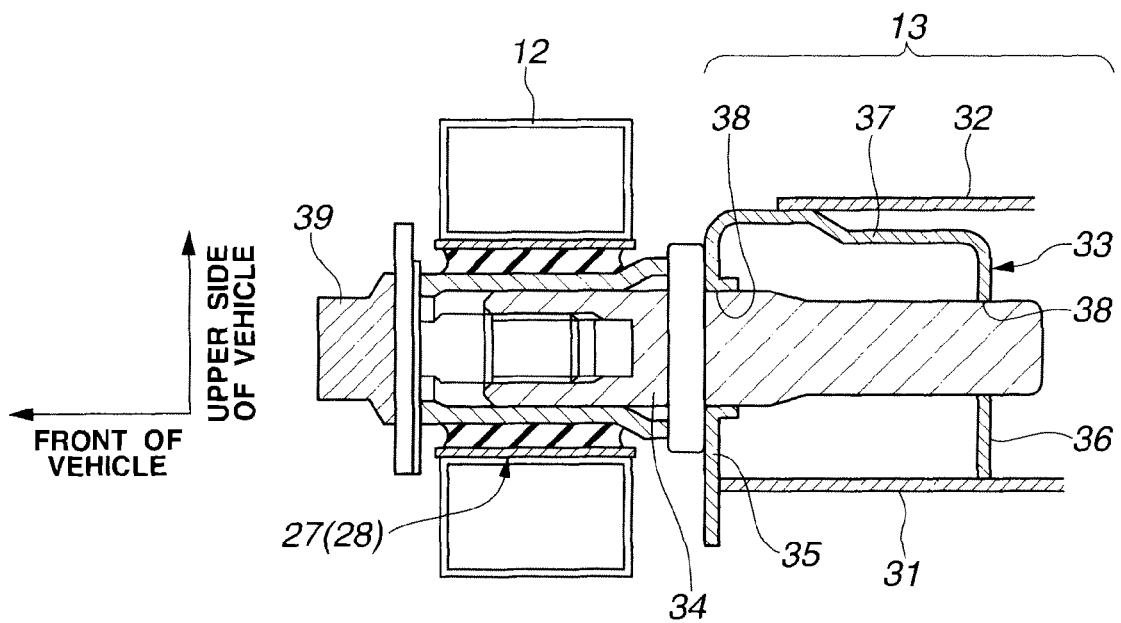
FIG. 6 is a sectional view showing the connecting structure of the lower rear link and lower front link through a front bracket.

Lower front link 12 and lower rear link 13 are connected through the front bracket 33 in a following manner. FIG. 6 shows, in section, the connecting structure of lower front link 12 and lower rear link 13 through front bracket 33. Front bracket 33 includes an outer bracket 35 (outer wall) on the front side in the front and rear direction, or on the front side of the vehicle body, an inner bracket 36 (inner wall) on the rear side in the front and rear direction or on the rear side of the vehicle body, and a connecting bracket 37 (upper wall or connection wall) connecting the upper ends of these outer and inner brackets 35 and 36 together into a united integral bracket. Accordingly, front bracket 33 is a plate (or sheet) member shaped like an inverted U opening downwards. Each of outer and inner brackets 35 and 36 extends in the vertical direction, and extends in the transverse direction to have a longer dimension in the transverse direction.

Connecting bracket 37 is connected with upper bracket 32 (upper wall) of lower rear link 13. Lower end portions of outer bracket 35 and inner bracket 36 are connected, respectively, with lower bracket 31 (lower wall) of lower rear bracket 13. Lower rear bracket 13 and front bracket 33 are joined together and united by arc welding. In this way, the outer and inner brackets 35 and 36 (outer and inner walls of the front bracket 33) are fixedly supported, at both of the upper and lower ends, by the lower bracket 31 and upper bracket 32 which serve, respectively as lower and upper wall of a structural frame of lower rear link 13 (formed by lower and upper brackets 31 and 32).

Through holes 38 are formed in outer and inner brackets 35 and 36 (outer and inner walls) of front bracket 33, respectively, for the connecting pins 34 for supporting the connect bushes 27 and 28. Each through hole 38 extends in the front and rear direction. Connecting pins 34 are fixed by welding in the state in which each of the connecting pins 34 is inserted from the front side of the vehicle body, into a corresponding one of through holes 38. Two of the connecting pins 34 are fixed to outer and inner bracket 35 and 36 of front bracket 33, respectively, at front and rear positions spaced in the front and rear direction which corresponds to the vehicle longitudinal direction (which is identical to the vehicle longitudinal direction when the suspension system is installed in the vehicle, that is). In the example shown in FIG. 2, each connection pin 34 extends straight in a direction perpendicular to the straight line L1.

An inner cylinder (71) of connect bush 27 or 28 is fit over a front portion of each connecting pin 34 which projects forwards toward the front of the vehicle body, and fixed through a washer by a fastening device 39 such as a fastening bolt. An outer cylinder (81) of connect bush 27 or 28 is press fit and fixed in lower front link 12. Thus, the lower front link 12 and lower rear link 13 are connected through front bracket 33.

Figure 7A:
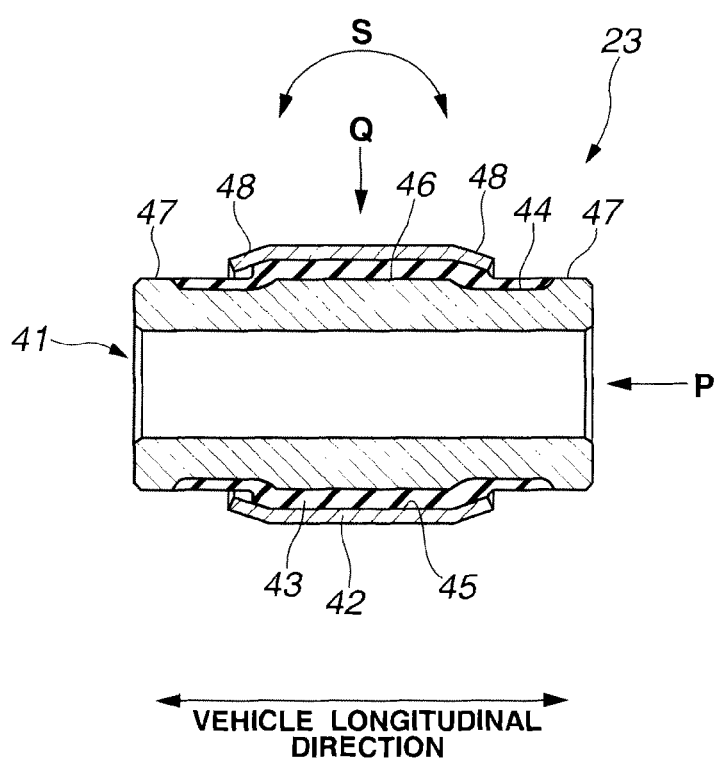
FIG. 7A is a longitudinal sectional view of the link bush.
Figure 7B:
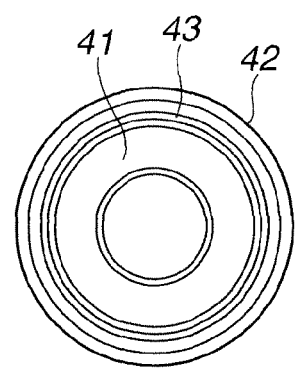
FIG. 7B is an end view.

The bush 23 is a link bush disposed between axle housing 11 and lower rear link 13 and constructed to have a following construction. FIG. 7 shows the link bush 23 serving as the outboard connection point on the wheel's side, in a single state. FIG. 7A is a longitudinal sectional view of link bush 23, and FIG. 7B is an end view. Bush 23 includes an inner cylinder 41 having an axis extending substantially in the vehicle longitudinal direction, an outer cylinder 42 surrounding the inner cylinder 41, and an elastic member 43 disposed radially between the inner and outer cylinders 41 and 42. Inner and outer cylinders 41 and 42 are metallic members made of metallic material such as STKM (carbon steel tubes for machine structural purposes). Inner cylinder 41 is connected with lower rear link 13, and outer cylinder 42 is connected with axle housing 11.

Inner and outer cylinders 41 and 42 are arranged coaxially substantially on the same axis. An outside circumferential surface 44 of inner cylinder 41 confronts an inside circumferential surface 45 of outer cylinder 42 radially. Inner cylinder 41 extends from one axial end to the other axial end in the axial direction P and includes a bulge portion 46 bulging radially outwards from the outside circumferential surface 44 in a middle portion, in the axial direction P of inner cylinder 41, between both axial ends of inner cylinder 41. A ridge line of bulge portion 46 is in the form of a low trapezoid in the longitudinal sectional view of FIG. 7A. Inner cylinder 41 further includes enlarged portions 47 enlarged radially outwards so as to increase the outside diameter, at both axial ends of outside circumferential surface 44 of inner cylinder 41.

The bulge portion 46 and enlarged portions 47 have outside circumferential surfaces which are cylindrical surfaces having the same diameter and the same radius from the axis of bush. Each of enlarged portions 47 is shorter in the axial dimension in the axial direction P than the bulge portion 46.

The axial length of outer cylinder 42 in the axial direction P is shorter than the axial length of inner cylinder 41 and longer than the axial length of bulge portion 46. Outer cylinder 42 covers the bulge portion 46. Inner cylinder 41 projects from both ends of outer cylinder 42 in opposite directions. At each of the axial ends of outer cylinder 42, there is formed an inwardly bent portion 48 bent radially inwards so as to conform the ridge line of bulge portion 46. With the inwardly bent portions 48 at both ends, the outer cylinder 42 has a concave inside circumferential surface 45 confronting the bulge portion 46. In this example, the concave inside circumferential surface 45 of outer cylinder 42 tightly covers the bulge portion 46 through the elastic member 43. Thus, the outer cylinder 42 is shaped like a barrel.

Elastic member 43 includes a middle portion filled between the bulge portion 46 of inner cylinder 41 and the outer cylinder 42, and two end portions each extending axially between bulge portion 46 and one of the enlarged portion 47 of inner cylinder 41. Each of the end portions of elastic member 43 has an outside circumference forming a continuous circumferential or cylindrical surface with the outside circumference of the adjacent enlarged portion 47. The middle portion of elastic member 43 bulges radially outwards in conformity with the bulge portion 46 of inner cylinder 41, and fits over the bulge portion 46. The middle portion of elastic member 43 extends axially in the axial direction P from one of the bent portions 48 of outer cylinder 42 to the other bent portion 48 so that the outside circumferential surface is in contact with the inside circumferential surface of outer cylinder 42 from one of the bent portion 48 to the other.

In the thus-constructed link bush, when the inner and outer cylinders 41 and 42 are displaced relative to each other in the axial direction P, then the elastic member 43 is deformed not only in the direction of shearing, but also in the direction of compressive deformation in the axial direction P. That is, part of a force acting in the shearing direction is converted into a compressive deformation in the axial direction P by the bulge portion 46 and bent portions 48. As a result, the stiffness of bush 23 in the axial direction P is increased.

When inner and outer cylinders 41 and 42 are displaced in the twisting direction S, the elastic member 43 is deformed mainly in the shearing direction rather than in the direction of compressive deformation. That is, most of the force acting in the shearing direction is converted into a shearing deformation in the twisting direction S. Therefore, the stiffness of bush 23 in the twisting direction S is decreased.

In this way, the stiffness of bush 23 in a direction (or diametrical direction) Q perpendicular to the axis, axial direction P and twisting direction S is determined by specification data items such as the height and angle of bulge portion 46, the length and thickness of elastic member 43 and the length and angle of bent portions 48.

Figure 8A:
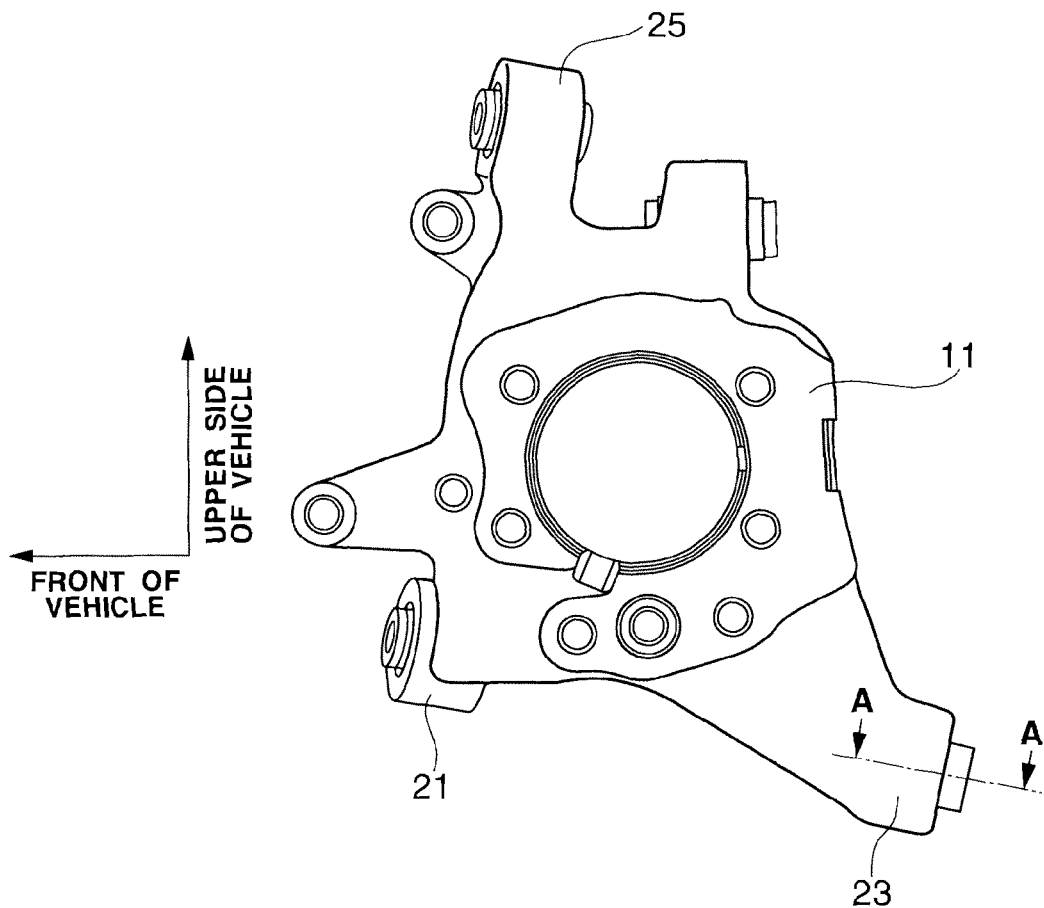
FIG. 8A is a view of the axle housing 11 viewed from the outboard side.
Figure 8B:
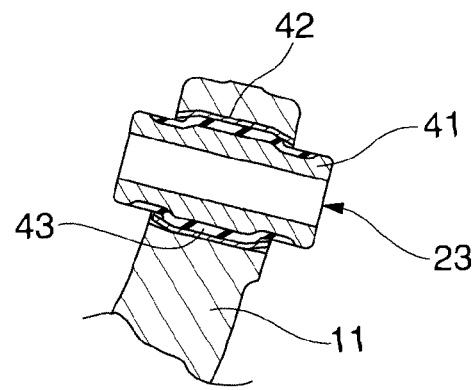
FIG. 8B is a sectional view taken across a line A-A in FIG. 8A.

The axle housing 11 and link bush 23 are connected in a following manner. FIG. 8 shows link bush 23 connected with axle housing 11. FIG. 8A is a view of axle housing 11 viewed from the outboard side, and FIG. 8B is a sectional view taken across a line A-A. The outer cylinder 42 of bush 23 is fixed by being forcibly fit in axle housing 11. The connecting pin (not shown in FIG. 8) fixed to lower rear link 13 is inserted into the inner cylinder 41 of bush 23. Thereby, lower rear link 13 is swingably connected with axial housing 11 through bush 23.

Figure 9A:
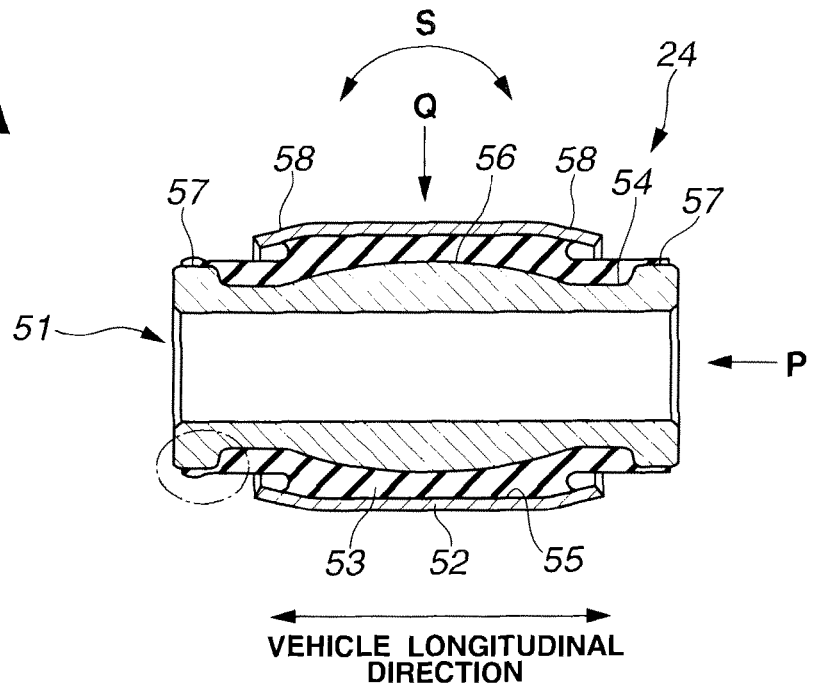
FIG. 9A is a longitudinal sectional view of the link bush 24.
Figure 9B:
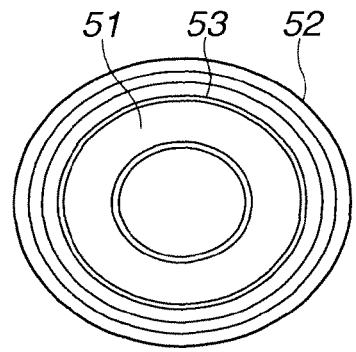
FIG. 9B is an end view.
Figure 9C:
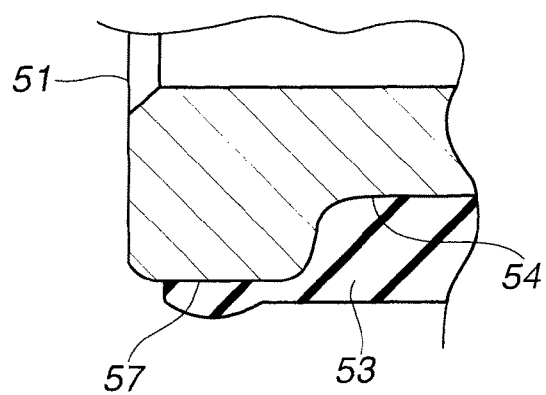
FIG. 9C is a partial enlarged view.

The bush 24 is a link bush disposed between suspension member 2 and lower rear link 13 and constructed to have a following construction. FIG. 9 shows the link bush 24 serving as the inboard connection point on the vehicle body's side, in a single state. FIG. 9A is a longitudinal sectional view of link bush 24, and FIG. 9B is an end view. FIG. 9C is a partial enlarged view. Bush 24 includes an inner cylinder 51 having an axis extending substantially in the vehicle longitudinal direction, an outer cylinder 52 surrounding the inner cylinder 51, and an elastic member 53 disposed radially between the inner and outer cylinders 51 and 52. Inner and outer cylinders 51 and 52 are metallic members made of metallic material such as STKM (carbon steel tubes for machine structural purposes). Inner cylinder 51 is connected with suspension member 2, and outer cylinder 52 is connected with lower rear link 13.

Inner and outer cylinders 51 and 52 are arranged coaxially substantially on the same axis. An outside circumferential surface 54 of inner cylinder 51 confronts an inside circumferential surface 55 of outer cylinder 52 radially. Inner cylinder 51 extends from one axial end to the other axial end in the axial direction P and includes a bulge portion 56 bulging radially outwards from the outside circumferential surface 54 in a middle portion, in the axial direction P of inner cylinder 51, between both axial ends of inner cylinder 51. A ridge line of bulge portion 56 is in the form of an arch or an arc in the longitudinal sectional view of FIG. 9A. Inner cylinder 51 further includes enlarged portions 57 enlarged radially outwards so as to increase the outside diameter, at both axial ends of outside circumferential surface 54 of inner cylinder 51.

The top of arched bulge portion 56 and enlarged portions 57 are equal in radial distance from the bush axis so that the (circular) top of arched bulge portion 56 and the outside circumferential or cylindrical surfaces of enlarged portions 47 are formed on a common single imaginary cylindrical surface around the bush axis. Each of enlarged portions 57 is shorter in the axial dimension in the axial direction P than the bulge portion 56.

The axial length of outer cylinder 52 in the axial direction P is shorter than the axial length of inner cylinder 51 and longer than the axial length of bulge portion 56. Outer cylinder 52 covers the bulge portion 56. Inner cylinder 51 projects from both ends of outer cylinder 52 in opposite directions. At each of the axial ends of outer cylinder 52, there is formed an inwardly bent portion 58 bent radially inward so as to conform the ridge line of bulge portion 56. With the inwardly bent portions 58 at both ends, the outer cylinder 52 has a concave inside circumferential surface 55 confronting the bulge portion 56. In this example, the concave inside circumferential surface 55 of outer cylinder 52 tightly covers the bulge portion 56 through elastic member 53. Thus, the outer cylinder 52 is shaped like a barrel.

Elastic member 53 includes a middle portion filled between the bulge portion 56 of inner cylinder 51 and the outer cylinder 52, and two end portions each extending axially between bulge portion 56 and one of the enlarged portion 57 of inner cylinder 51. Each of the end portions of elastic member 53 has a projection projecting radially outwards to form a convex surface and covering the adjacent enlarged portion 57 as shown in FIG. 9C. The middle portion of elastic member 53 bulges radially outwards in conformity with the bulge portion 56 of inner cylinder 51, and fits over the arched bulge portion 56. The middle portion of elastic member 53 extends axially in the axial direction P from one of the bent portions 58 of outer cylinder 52 to the other bent portion 58 so that the outside circumferential surface is in contact with the inside circumferential surface of outer cylinder 52 from one of the bent portion 58 to the other.

In the thus-constructed link bush, when the inner and outer cylinders 51 and 52 are displaced relative to each other in the axial direction P, then the elastic member 53 is deformed not only in the direction of shearing, but also in the axial direction P of compressive deformation. That is, part of a force acting in the shearing direction is converted into a compressive deformation in the axial direction P by the bulge portion 56 and bent portions 58. As a result, the stiffness of bush 24 in the axial direction P is increased.

When inner and outer cylinders 51 and 52 are displaced in the twisting direction S, the elastic member 53 is deformed mainly in the shearing direction rather than in the direction of compressive deformation. That is, most of the force acting in the shearing direction is converted into a shearing deformation in the twisting direction S. Therefore, the stiffness of bush 24 in the twisting direction S is decreased.

In this way, the stiffness of bush 24 in the direction (or diametrical direction) Q perpendicular to the axis, axial direction P and twisting direction S is determined by specification data items such as the height and angle of bulge portion 56, the length and thickness of elastic member 53 and the length and angle of bent portions 58.

Figure 10A:
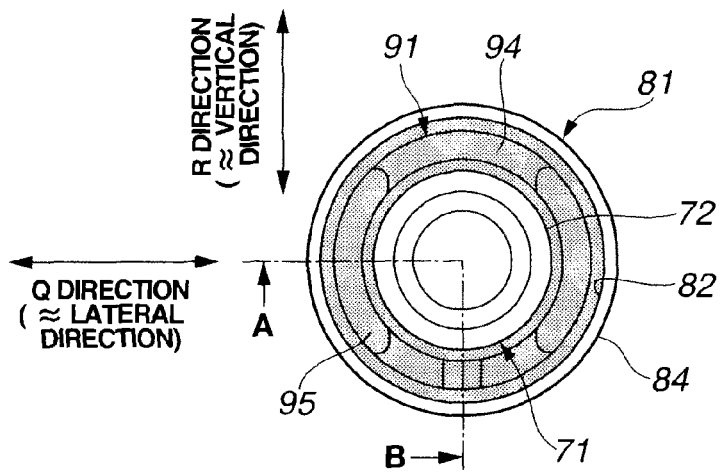
FIG. 10A is a top view of the connect bush.
Figure 10D:
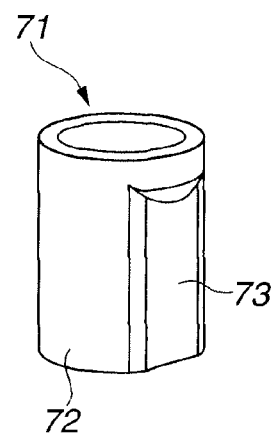
FIG. 10D is a perspective view of an inner cylinder of the connect bush.
Figure 10B:
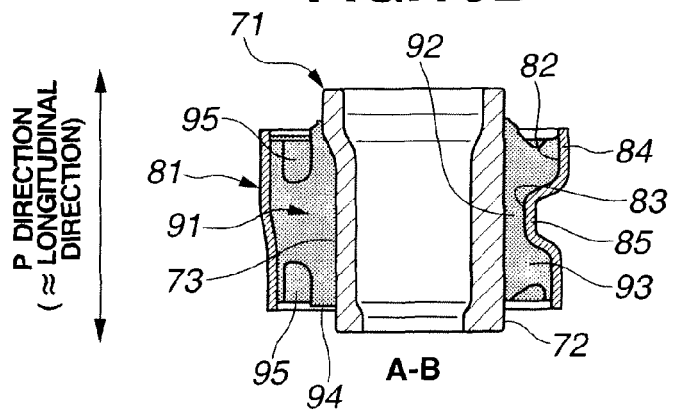
FIG. 10B is a longitudinal sectional view taken across a line A-B shown in FIG. 10A.
Figure 10E:
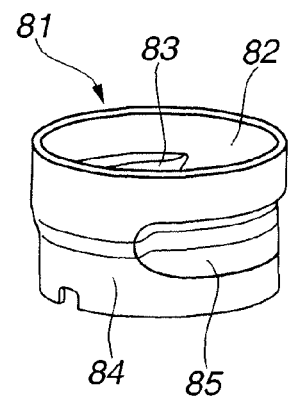
FIG. 10E is a perspective view of an outer cylinder of the connect bush.
Figure 10C:
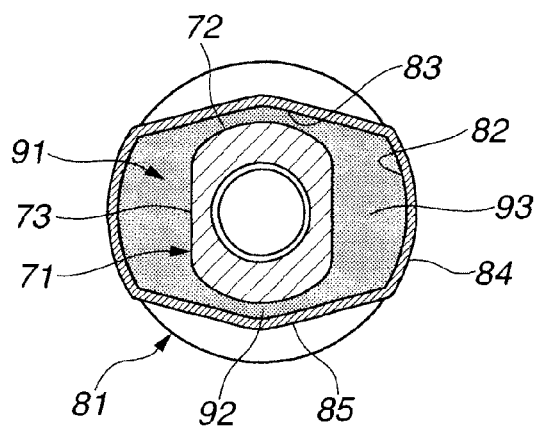
FIG. 10C is a cross sectional view cut by a plane to which the axis is perpendicular.

Connect bushes 27 and 28 are constructed in a following manner. Connect bushes 27 and 28 are identical in construction. Accordingly, the following explanation is directed to connect bush 27 only. FIG. 10 shows the connect bush in a single state. FIG. 10A is a top view of connect bush 27. FIG. 10B is a longitudinal sectional view taken across a line A-B shown in FIG. 10A. FIG. 10C is a cross sectional view cut by a plane to which the axis is perpendicular. FIG. 10D is a perspective view of an inner cylinder, and FIG. 10E is a perspective view of an outer cylinder. Connect bush 27 includes an inner cylinder (or tube) 71 having an axis extending substantially in the vehicle front and rear (or longitudinal) direction, an outer cylinder (or tube) 81 surrounding the inner cylinder 71, and an elastic member 91 interposed (radially) between the inner and outer cylinders 71 and 81. Inner cylinder 71 is connected with the projecting or extending portion 16 of lower rear link 13, and outer cylinder 81 is connected with lower front link 12.

The inner and outer cylinders 71 and 81 are arranged coaxially (substantially on the same axis). An outside circumferential surface 72 of inner cylinder 71 confronts (radially) an inside circumferential surface 82 of outer cylinder 81. Outer cylinder 81 includes a pair of convex portions 83 projecting radially inwards toward the outside circumferential surface 72 of inner cylinder 71, respectively from two positions (diametrically opposite circumferential positions) spaced from each other in the vertical direction (R) corresponding to the vehicle vertical direction) on the inside circumferential surface 82 of outer cylinder 81. The convex portions 83 are formed at a middle or in a central portion between the two axial ends of outer cylinder 81 extending in the P direction, and each convex portion 83 extends circumferentially approximately in a (horizontal) side direction (Q) (corresponding to the vehicle lateral direction), in the form of streak like a ridge.

Convex portions 83 are formed by deforming the outer circumferential or cylindrical surface 84 of outer cylinder 81 into a concave form recessed in the vertical direction R (vehicle vertical direction), radially inwards toward the inner cylinder 71. That is, the convex portions 83 are formed by compressing the outer cylinder 81 in the vertical direction R, from both of the diametrically opposite radial outer sides to form compressed portion or concave grooves 85 extending circumferentially like a circular arc and being recessed radially inwards.

With the convex portions 83 of outer cylinder 81, the elastic member 91 is formed with thin wall portions 92 and thick wall portions 93. The thin wall portions 92 are spaced in the vertical direction R at upper and lower (diametrically opposite) positions, and deformed to have a thinner wall thickness.

The thick wall portions 93 are spaced in the side direction (Q) at (outboard and inboard) (diametrically opposite) positions, and formed to have a thicker wall thickness greater than the wall thickness of the thin wall portions 92. Therefore, in the compressive deformation in the diametrical direction perpendicular to the axis, the stiffness or rigidity of the thin wall portions 92 is made higher than the stiffness of thick wall portions 93. In other words, the connect bush 27 is stiff (higher elastic force) in the vertical direction R (≈the vehicle vertical direction), and soft (lower elastic force) in the side (horizontal) direction (Q) (≈the vehicle lateral direction). Thus, the connect bush 27 serves as a stiff spring in the vehicle vertical direction and serves as a soft spring in the vehicle lateral direction.

Convex portions 83 are formed in outer cylinder 81 after the elastic member 91 is formed by vulcanization or curing between inner and outer cylinders 71 and 81. In this production method of forming the convex portions 83 in the inside circumferential surface 82 of outer cylinder 81 after the formation of elastic member 91, the portions of elastic member 91 between the outside circumferential surface 72 of inner cylinder 71 and the convex portions 83 of outer cylinder 81 are made dense to have a higher density as compared to the remaining portion, and hence the stiffness in the vertical direction R (≈vehicle vertical direction) is further increased.

Elastic member 91 extends axially (in the direction P) from one of two axial end surfaces 94 to the other, and each of the axial end surfaces 94 is formed with two hollow portions (or relief portion) 95 (circumferential grooves) at two diametrically opposite positions in the side direction (Q) (corresponding to the vehicle lateral direction). Each of the hollow portions 95 is in the form of a circumferential groove 95 depressed in the axial direction and extended in the circumferential direction around the axis of elastic ember 91. The circumferential grooves 95 are not so deep as to pierce the elastic member 95. With the circumferential grooves 95, the stiffness of elastic member 91 is decreased in the side direction (Q) as compared to an elastic member having no grooves 95.

Inner cylinder 71 includes cut surfaces 73 formed in the outside circumferential surface 72 at two diametrically opposite positions spaced in the side direction (Q). The cut surfaces 73 are substantially in the form of two parallel flat planes extending substantially in parallel to the vertical direction R. Cut surfaces 73 extend axially from one of the axial ends of inner cylinder 71, and terminate without reaching the other axial end of inner cylinder 71. With these cut surfaces 73, the radial thickness (the thickness in the radial direction) of inner cylinder 71 measured in the vertical direction R is smaller than the radial thickness of inner cylinder 71 measured in the side direction (Q). Accordingly, the radial thickness of elastic member 91 is increased in the side direction (Q) with the outer cylinder 81 having the inside diameter being set constant, and the stiffness of elastic member 91 is decreased in the side direction (Q) as compared to a bush structure having no cut surfaces 73.

In the thus-constructed connect bush 27 (or 28), the stiffness in the vertical direction R (first perpendicular direction perpendicular to the axis) corresponding to the vehicle vertical direction is adjusted by adjusting the radial thickness, the axial width and/or the circumferential length of thin wall portion or portions 92 in elastic member 91, and/or by adjusting the amount of projection, the axial width and/or the length in the side direction (Q), of the convex portion or portions 83. The stiffness in the side direction (Q) (second perpendicular direction perpendicular to the axis) corresponding to the vehicle lateral direction is adjusted by adjusting the axial depth, the radial width and/or the circumferential length of groove or grooves 95, and/or by adjusting the axial length, the length in the vertical direction R and/or the height (=the distance from the axis) of cut surface or surfaces 73. By adjusting at least one of these factors, it is possible to adjust the stiffness in every angular direction perpendicular to the axis, around the axis.

In the above-mentioned bush production method including a first step of forming the elastic member 91 by vulcanization between inner and outer cylinders 71 and 81, and a second step of forming the convex portions 83 in inside circumferential surface 82 of outer cylinder 81; the two convex portions 83 are to be formed at two positions arranged in the first perpendicular direction R of the bush) shifted from the positions of the two grooves 95 (arranged in the second perpendicular direction Q of the bush) by 90 degrees in phase. Two grooves 95 and two cut surfaces 73 are arranged in the same angular direction (Q). Therefore, the two convex portion 83 can be formed at the angular position rotated by 90 degrees with respect to the cut surfaces 73.

Therefore, in the operation of forming convex portions 83 In the production process of connect bush 27 (or 28), the connect bush 27 (or 28) is set in a jig (not shown) with reference to the cut surfaces 73. Thus, the cut surfaces 73 are used as means for positioning the connect bush with respect to the jig in the production process of the connect bush.

Figure 11:
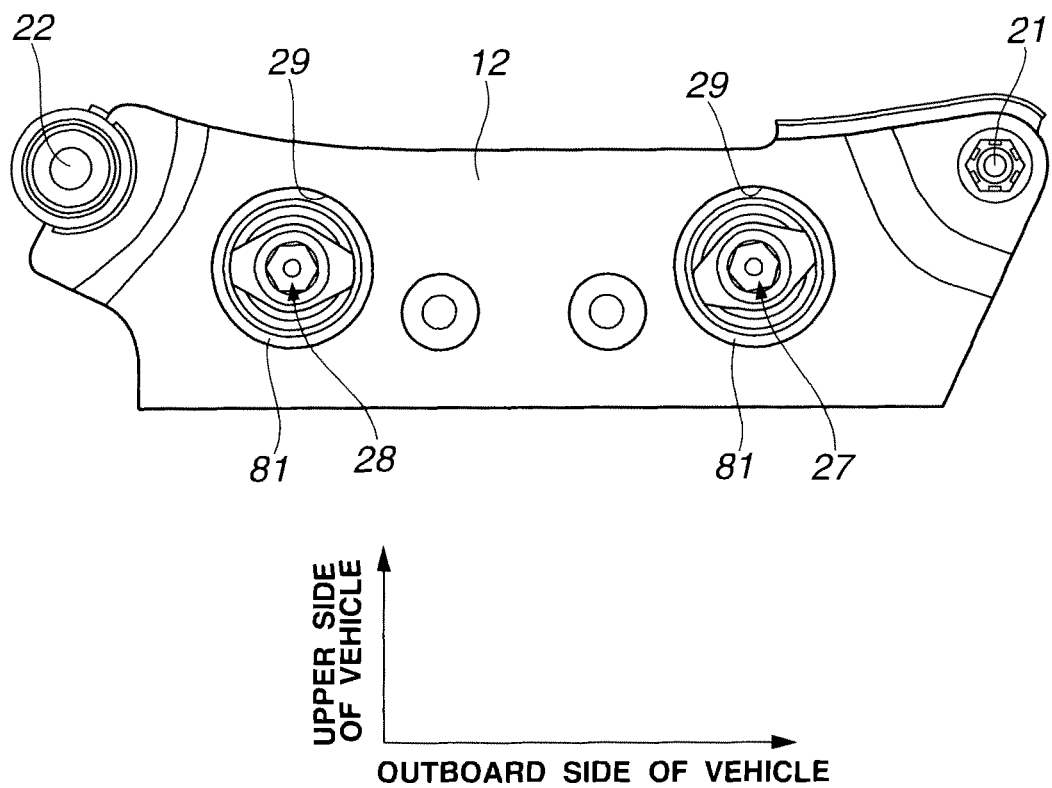
FIG. 11 is a front view showing the connect bush connected with the lower front link.
Figure 12A:
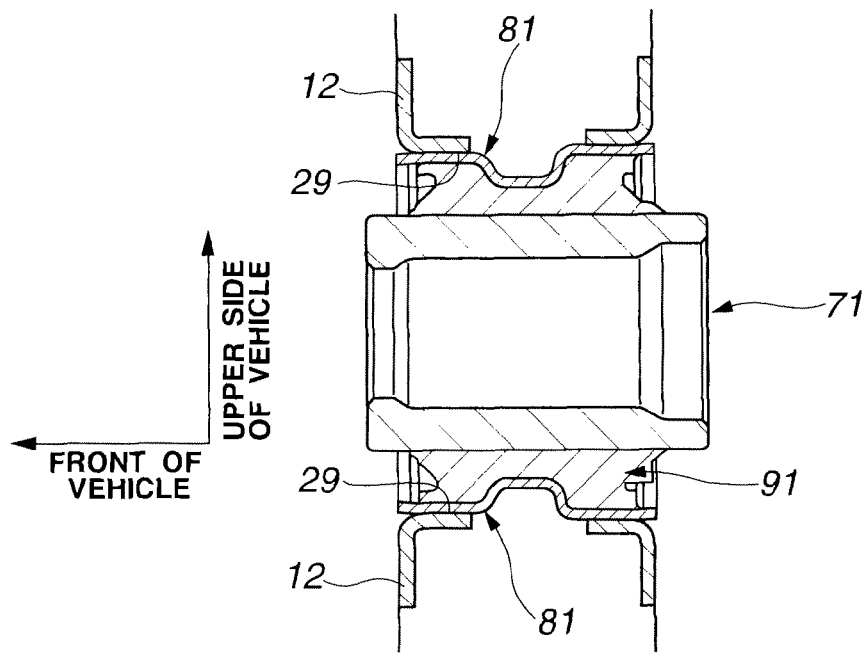
FIG. 12A is a longitudinal sectional view of the connect bush.
Figure 12B:
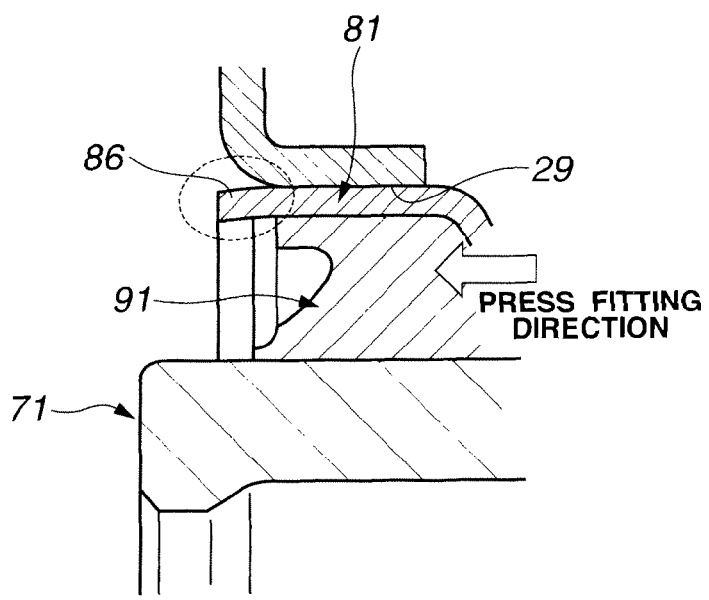
FIG. 12B is an enlarged sectional view showing a forward end of the outer cylinder of the connect bush.

FIG. 11 is a front view showing the connect bushes 27 and 28 connected with lower front link 12. FIG. 12 shows, in section, the connect bush 27 connected with lower front link 12. FIG. 12A is a longitudinal sectional view of connect bush 27, and FIG. 12B is an enlarged sectional view showing a forward end 86 of outer cylinder 81 in a press fitting direction. Connect bush 27 is inserted forcibly into the lower front link 12 from the rear side (corresponding to the rear side of the vehicle). Specifically, the outer cylinder 81 of connect bush 27 is forcibly fit in an engagement hole 29 of lower front link 12 from the rear side. The forward end 86 of outer cylinder 81 leading in the press-fitting direction is slightly bent radially inwards or slightly tapered and used as a guide for assisting insertion of connect bush 27 into the engagement hole 29 of lower front link 12.

FIGS. 13A~13E are front views showing examples of the installation of connect bushes 27 and 28 to lower front link 12. In each of connect bushes 27 and 28, the direction Q (second perpendicular direction) is the direction in which the circumferential grooves 85 confront each other, and the direction R (first perpendicular direction) is the direction in which convex portions 83 (concave portions 85) confront each other. The straight line L1 is an imaginary line connecting the front outboard connection point (determined by the axis of link bush 21) of lower front link 12 and the front inboard connection point (determined by the axis of link bush 22).

Generally, each bush 27 or 28 is so oriented that the direction Q extends approximately in the vehicle lateral direction or along the straight line L1, and the direction R extends approximately in the vehicle vertical direction, or the vertical direction perpendicular to the straight line L1. However, the direction Q and direction R of each connect bush 27 or 28 are set appropriately in consideration of various factors. For example, the directions Q and R of connect bushes 27 and 28 are determined in consideration of front and rear compliance steer characteristics at the time of braking and the front and rear suspension stiffnesses for the vehicle handling and stability, and in consideration of the vehicle front and rear resonance frequencies for the sound and vibration performance.

Figure 13A:
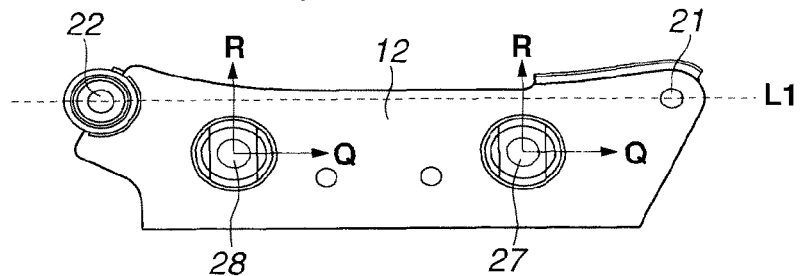
FIGS. 13A~13E are front views showing examples of the installation of connect bushes to the lower front link.

In the example shown in FIG. 13A, the (vertical) direction R of each of the outboard connect bush 27 and inboard connect bush 28 is directed in the vehicle vertical direction, or direction perpendicular to the straight line L1.

Figure 13B:
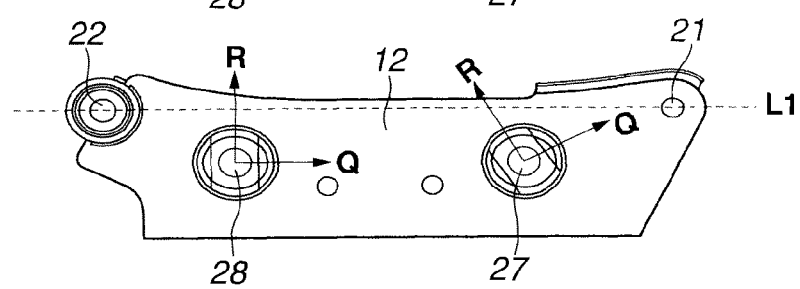

In the example shown in FIG. 13B, the (vertical) direction R of the outboard connect bush 27 is inclined to the inboard side so that the upper side in the direction R is closer to the inboard connection point (bush 22), and the vertical direction R of inboard connect bush 28 is held in the vehicle vertical direction, or the direction perpendicular to the straight line L1. For example, the direction R of outboard connect bush 27 is rotated by about 30 degrees with respect to the vehicle lateral direction in the counterclockwise direction as viewed in a front view of the vehicle body in the standard posture of the vehicle body.

Figure 13C:
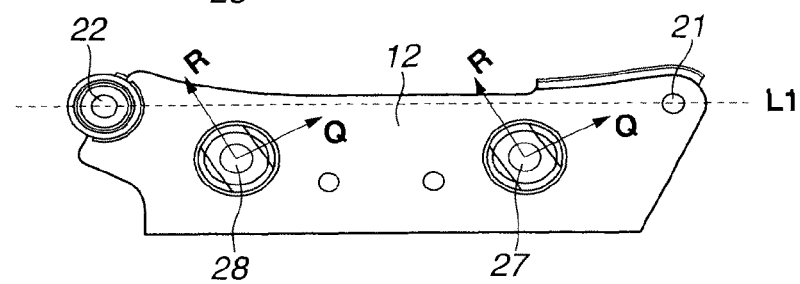

In the example shown in FIG. 13C, the (vertical) direction R of each of the outboard connect bush 27 and inboard bush 28 is inclined to the inboard side so that the upper side in the direction R is closer to the inboard connection point (bush 22). For example, the directions R of outboard and inboard connect bush 27 and 28 are rotated by about 30 degrees with respect to the vehicle lateral direction in the counterclockwise direction as viewed in a front view of the vehicle body in the standard posture of the vehicle body.

Figure 13D:
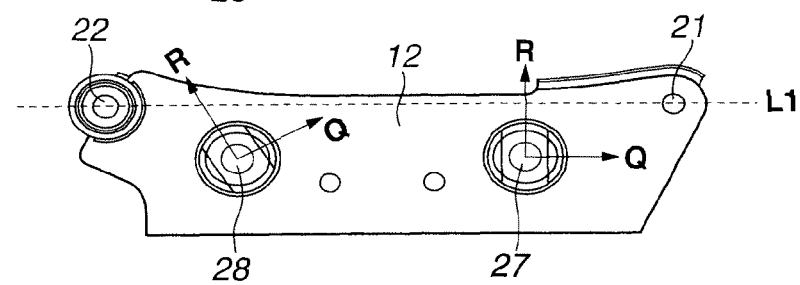

In the example shown in FIG. 13D, the vertical direction R of outboard connect bush 27 is held in the vehicle vertical direction, or the direction perpendicular to the straight line L1, and the (vertical) direction R of the inboard connect bush 28 is inclined to the inboard side so that the upper side in the direction R is closer to the inboard connection point (bush 22). For example, the direction R of inboard connect bush 28 is rotated by about 30 degrees with respect to the vehicle lateral direction in the counterclockwise direction as viewed in a front view of the vehicle body in the standard posture of the vehicle body.

Figure 13E:
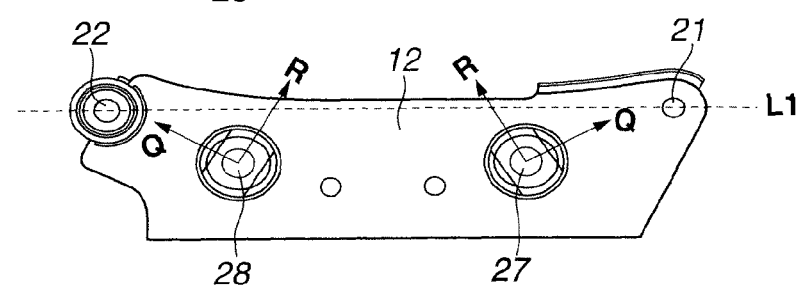

In the example shown in FIG. 13E, the (vertical) direction R of the outboard connect bush 27 is inclined to the inboard side so that the upper side in the direction R is closer to the inboard connection point (bush 22), and the vertical direction R of inboard connect bush 28 is inclined to the outboard side so that the upper side in the direction R is closer to the outboard connection point (bush 21). For example, the direction R of outboard connect bush 27 is rotated by about 30 degrees with respect to the vehicle lateral direction in the counterclockwise direction and the direction R of inboard connect bush 28 is rotated by about 30 degrees with respect to the vehicle lateral direction in the clockwise direction as viewed in a front view of the vehicle body in the standard posture of the vehicle body.

<Operations>

Figure 14A:
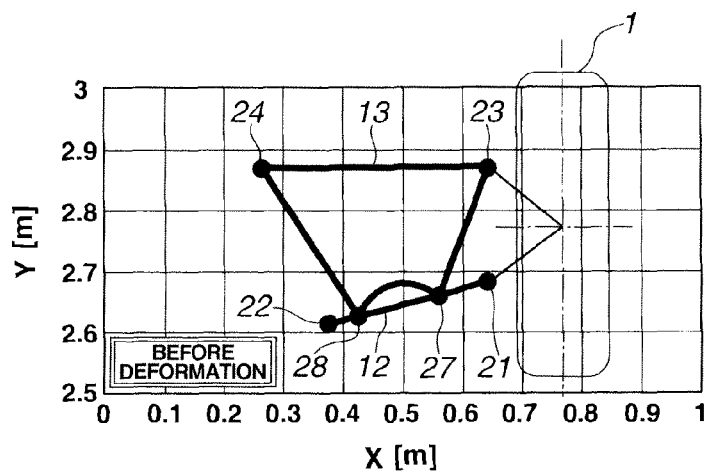
FIG. 14A is a plan view showing the link state before deformation.
Figure 14B:
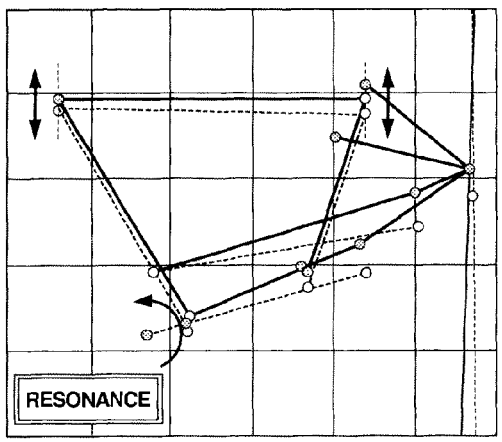
FIG. 14B is a plan view showing the link state at the time of resonance.
Figure 14C:
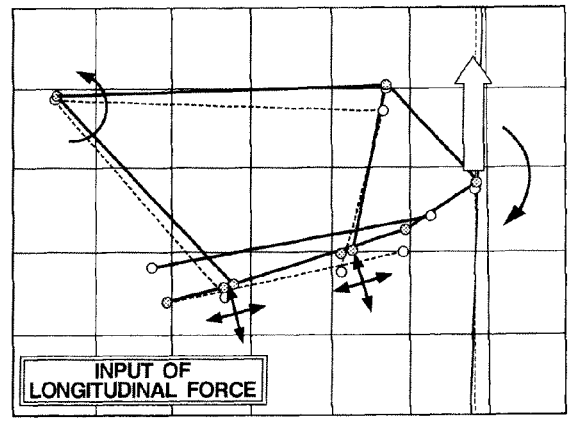
FIG. 14C is a plan view showing the link state at the time of input of a longitudinal force.

FIG. 14 shows the states of the suspension links at the time of resonance and input of a longitudinal force. FIG. 14A is a plan view showing the link state before deformation. FIG. 14B is a plan view showing the link state at the time of resonance. FIG. 14C is a plan view showing the link state at the time of input of a longitudinal force.

In general, the suspension system has a primary resonance frequency of about 15~20 Hz in the vehicle longitudinal direction. In the deformation mode in this case, as shown in FIG. 14B, the lower rear link 13 resonates in the vehicle longitudinal direction with a main spring in the axial direction at the connection point (bush 23) of lower rear link 13 on the wheel's side, and a main spring in the axial direction at the connection point (bush 24) of lower rear link 13 on the vehicle body's side.

Therefore, in order to improve the sound and vibration performance, it is conceivable to reduce the transmission of vibrations to the vehicle body by bringing the resonance points of bushes 23 and 24 to a higher frequency band in the primary resonance. However, in the bush structure of earlier technology using the inner and outer cylinders having straight cylindrical shapes, the elastic member is subjected to deformation only in the shearing direction in the case of relative displacement in the axial direction, so that it is difficult to increase the stiffness in the axial direction. As a result, it is difficult to shift the bush to a higher frequency side.

The suspension system of the commonly-used type is arranged to improve the stability during braking in a cornering operation by changing the orientation of the tire to the direction of toe-in when a longitudinal force due to braking is inputted at the tire ground contact point. In the deformation mode in this case, as shown in FIG. 14C, the vehicle body's side connection point (bush 24) of lower rear link 13 is displaced in the prying or twisting direction, and the connect bushes 27 and 28 are displaced in the axial direction and the direction perpendicular to the axis. In each of connect bushes 27 and 28, the displacement in the direction perpendicular to the axis is greater than the displacement in the axial direction.

It is desired to increase the static spring constant of the inboard connection point (bush 24) for lower rear link 13 in order to increase the lateral stiffness. On the other hand, in order to ensure a smoother toe-in characteristic responsive to input of a longitudinal force during braking, it is desired to lower the stiffness in the prying or twisting direction at bush 24. In other words, there is a trade-off relationship between these stiffnesses.

In the bush structure according to this embodiment, the outside circumferential surface 44 (54) of inner cylinder 41 (51) of link bush 23 (or 24) is formed with the bulge portion 46 (56) bulging radially outwards from the outside circumferential surface 44 (54) at a middle of the inner cylinder in the axial direction. Moreover, the outer cylinder 42 (52) includes the bent portions 48 (58) bent radially inwards in conformity with the ridge line or slope of bulge portion 46 (56), respectively, at both axial ends of outer cylinder 42 (52) in the axial direction P.

Therefore, when the inner and outer cylinders 41 and 42 (51 and 52) are displaced relative to each other in the axial direction P, then the elastic member 53 is deformed not only in the shearing direction, but also deformed in the axial direction P in the form of compressive deformation. That is, part of the force acting in the shearing direction is converted into a compressive deformation in the axial direction P by the bulge portion 46 (56) and bent portions 48 (58). As a result, it is possible to decrease the stiffness in the prying or twisting direction S in link bush 23 (24) and, on the other hand, to increase the stiffness in the axial direction. Therefore, it is possible to shift the resonance point to a higher frequency side in the deformation mode in the axial direction and thereby to improve the sound and vibration characteristics.

When inner and outer cylinders 41 and 42 (51 and 52) are displaced in the twisting direction S, the elastic member 43 (53) is deformed mainly in the shearing direction rather than in the direction of compressive deformation. That is, most of the force acting in the shearing direction is converted into a shearing deformation in the twisting direction S. Therefore, the stiffness of bush 23 (24) in the twisting direction S is decreased. Therefore, it is possible to ensure the toe-in characteristic smoothly with respect to the input of the longitudinal force at the time of braking, and thereby improve the steering stability of the vehicle.

Furthermore, in the lateral stiffness of the suspension, it is possible to set the stiffness at a higher level since the deformation mode of elastic member 43 (53) of bush 23 (24) is a compressive deformation mode in the direction Q perpendicular to the axis. Consequently, it is possible to restrain the trade-off relationship between an increase of the stiffness in the direction Q perpendicular to the axis and a decrease of the stiffness in the twisting direction S, and to improve both the sound and vibration performance and the steering stability simultaneously.

The outside circumferential surface 44 (54) of inner cylinder 41 (51) is formed with the enlarged (end) portions 47 (57) enlarged radially outwards so as to increase the outside diameter, at both axial ends of outside circumferential surface 44 (54). The enlarged (end) portion 47 (57) formed at each end of inner cylinder 41 (51) acts to increase the areas of the end surface, and hence decrease the surface pressure at the end surface in the state in which the inner cylinder 41 (51) is connected with a mating member. The enlarged portions 47 (57) are formed only in the axial end portions, and the outside circumferential surface 44 (54) of inner cylinder 41 (51) is not enlarged radially outward in a central region confronting the inside circumferential surface 45 (55) of outer cylinder 42 (52). Accordingly, it is possible to ensure a sufficient clearance from the outer cylinder 42 (52), and hence a sufficient suspension stroke.

In the inboard link bush 24 at least, the elastic member 53 is formed in an axial range from the position including the enlarged portion 57 at one end to the position including the enlarged portion 57 at the other end. Therefore, the elastic member 54 can prevent direct interference between the enlarged portion 57 and bent portion 58 on each side when inner and outer cylinders 51 and 52 are displaced relatively in the twisting direction S.

In the connect bushes 27 and 28, the angular position in the circumferential direction is so set as to make the stiffness in the vehicle lateral direction lower than the stiffness in the vehicle vertical direction. Therefore, when a longitudinal force is inputted during braking, the lower front link 12 is liable to displace in the axial direction along the straight line L1 and makes it easy to ensure the toe-in characteristic.

The balance between internal forces between lower front and rear links 12 and 13 is varied in dependence on the angular positions of connect bushes 27 and 28. Therefore, it is possible to further improve the steering stability and the sound and vibration performance by adjusting the Q, R directions of connect bushes 27 and 28 in consideration of the front and rear compliance steer at the time of braking, the front and rear suspension stiffnesses, and the vehicle longitudinal resonance frequency.

The lower front link 12 and lower rear link 13 are connected through the front bracket 33 in a following manner. Front bracket 33 has a structure including outer and inner walls (outer and inner bracket) 35 and 36 each including the lower end fixed to the lower wall (lower bracket) 31 of the structural frame (31, 32) of lower rear link 13, and the upper end fixed to the upper wall (upper bracket) 32 of the structural frame of lower rear link 13, so that the outer and inner walls 35 and 36 are firmly fixed at both ends to secure the relative position firmly. Each of the connection pins 34 supporting the connect bushes 27 and 28, respectively is connected with, and supported by, both of the outer and inner walls 35 and 36.

Therefore, it is possible to increase the rigidity or local rigidity of the structure connecting the front bracket 33 and lower rear link 13, with respect to loads applied to connect bushes 27 and 28 in the axial direction and the direction perpendicular to the axis. With this structure, it is possible to secure the toe-in characteristic effectively with respect to the input of a longitudinal force at the time of braking, to improve the steering stability performance, and to improve the resonance performance by making higher the front and rear resonance frequency.

Figure 15:
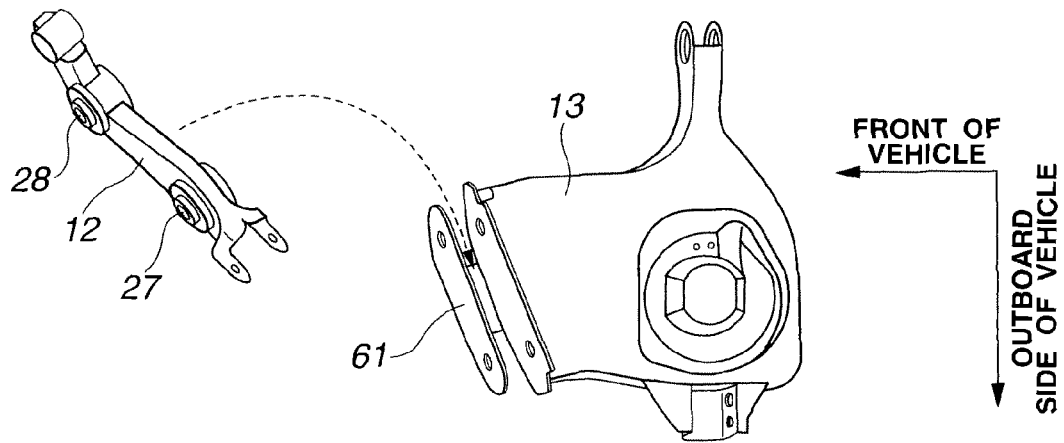
FIG. 15 is a perspective view showing a lower link structure in a comparative example.

FIG. 15 shows, in perspective, a lower link structure in a comparative example. In this comparative example, an L-shaped bracket 61 is connected to the front side of lower rear link 13, and the front bracket or link 12 is interposed between the L-shaped bracket 61 and lower rear link 13. In this comparative example, L-shaped bracket 61 is connected with lower rear link 13 only at the lower end of L-shaped bracket 61.

Figure 16A:
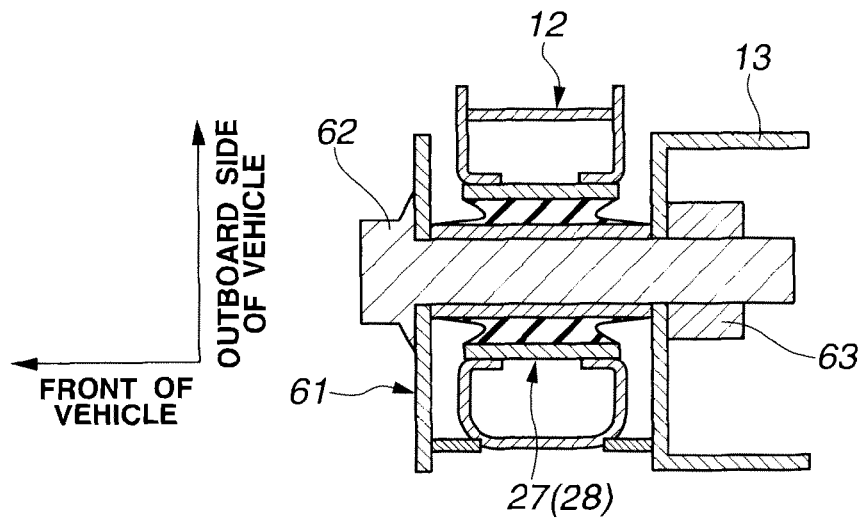
FIG. 16A is a sectional view showing the connecting structure in the state before a load is applied to the connect bush.
Figure 16B:
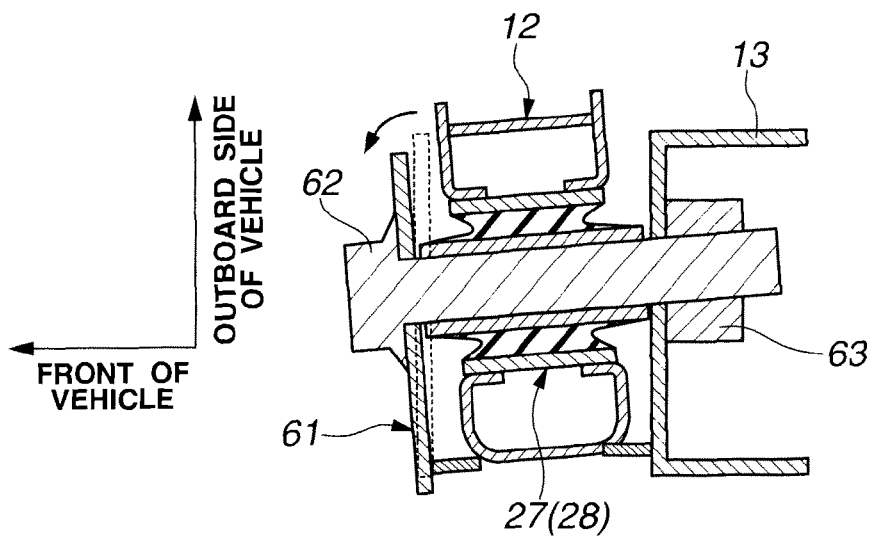
FIG. 16B is a sectional view showing the connecting structure in the state in which load is applied to the connect bush.

FIG. 16 shows, in section, the connecting structure between lower front link 12 and lower rear link 13. FIG. 16A is a sectional view showing the connecting structure in the state before loads are applied to connect bushes 27 and 28 in the axial direction and the perpendicular direction perpendicular to the axis. FIG. 16B is a sectional view showing the connecting structure in the state in which loads are applied to connect bushes 27 and 28 in the axial direction and the perpendicular direction perpendicular to the axis.

A fastening bolt 62 is inserted, from the front side of L-shaped bracket 61, and a fastening nut 63 is tightened on the forward end portion of bolt 62 in the state in which L-shaped bracket 61, connect bush 27 (28) and lower rear link 13 are clamped between the head of bolt 62 and the nut 63. Thus, lower front and rear links 12 and 13 are connected with each other through L-shaped bracket 61.

L-shaped bracket 61 is connected with lower rear link 13 only at the lower end, so that the L-shaped bracket 61 can be deformed by application of a force in an out-of-plane direction (vehicle forward direction) at the time of front and rear resonance. Accordingly, the rigidity is locally low, and this structure is inadequate for shifting the front and rear resonance point to the higher frequency side. Moreover, the L-shaped bracket 61 has the shape opening upwards, so that L-shaped bracket 61 is liable to collect splash of muddy water. Therefore, the durability might be decreased in this connecting structure including L-shaped bracket 61, and lower front and rear links 12 and 13.

In the case of the front bracket 33 according to the embodiment of the present invention, by contrast, the inner bracket 36 is disposed inside the lower rear link 13, and the lower rear link 13 is closed by outer bracket 35. This structure is unlikely to collect muddy water, and advantageous for improving the reliability and durability of the component parts.

It is optional to change the shape, position and number of each component part arbitrarily within the purview of the present invention.

In the illustrated example of the embodiment: lower front link 12 corresponds to "front suspension link"; lower rear link 13 corresponds to "rear suspension link"; at least one of the wheel 1 (or axle housing 11) and suspension member 2 corresponds to "connection partner member" or "link support member"; at least one of bushes 23 and 24 corresponds to "link bush"; inner cylinder 41 or 51 corresponds to "link inner cylinder"; outer cylinder 42 or 52 corresponds to "link outer cylinder"; elastic member 43 or 53 corresponds to "link elastic member"; inner cylinder 71 of at least one of connect bushes 27 and 28 corresponds to "connect inner cylinder"; outer cylinder 81 of at least one of connect bushes 27 and 28 corresponds to "connect outer cylinder"; elastic member 91 of at least one of connect bushes 27 and 28 corresponds to "connect elastic member"; lower bracket 31 and upper bracket 32 correspond to "structural frame" or "frame bracket"; outer bracket 35 corresponds to "front bracket" or "outer wall"; and inner bracket 36 corresponds to "rear bracket" or "inner wall".

<Variation Examples>

In the illustrated example, the inner cylinder 71 is connected with the projecting or extending portion 16 of lower rear link 13, and the outer cylinder 81 is connected with lower front link 12. However, it is possible to employ an arrangement in which outer cylinder 81 is connected with the projecting portion 16 of lower rear link 13, and the inner cylinder 71 is connected with lower front link 12. This arrangement, too, can provide the same effects and operations. In the bush 23 between lower rear link 13 and axle housing 11, the bulge portion 46 may be spherical. The same applies to the bush 24 between lower rear link 13 and suspension member 2.

Figure 17:
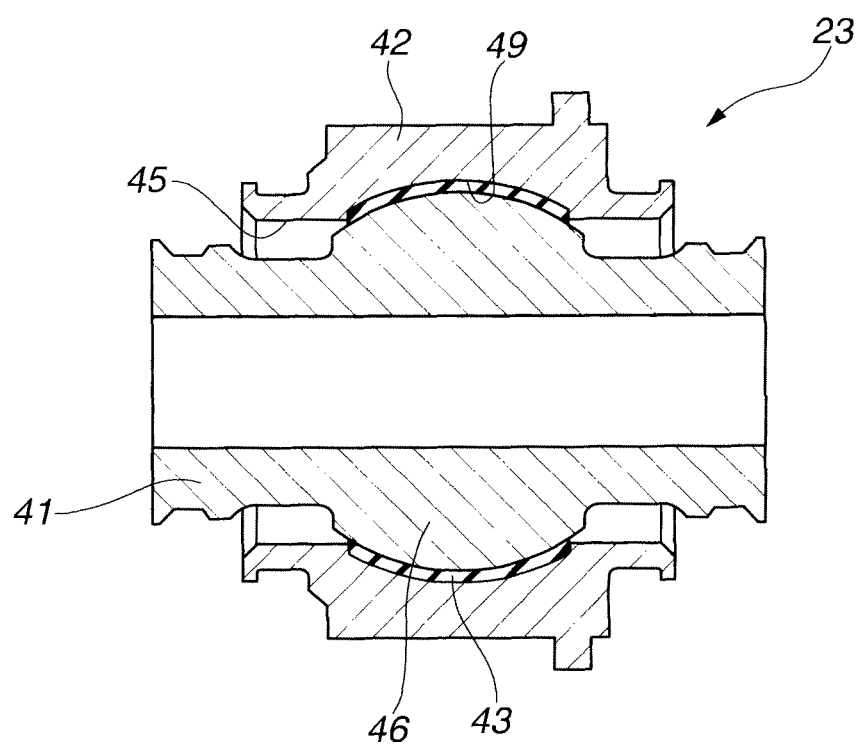
FIG. 17 shows a variation example of the link bush.

FIG. 17 shows a variation example of the link bush. The bush 23 shown in FIG. 17 includes a spherical bulge portion 46 bulging radially outward from the outside circumferential surface of the inner cylinder 41 so as to form a spherical surface, like a pillow ball bush. The inside circumferential surface 45 of the outer cylinder 42 includes a spherical concave surface 49 confronting the spherical bulge portion 46 of the inner cylinder 41 radially across the elastic member 43. This variation example, too, can provide the same effects and operations.

Figure 18:
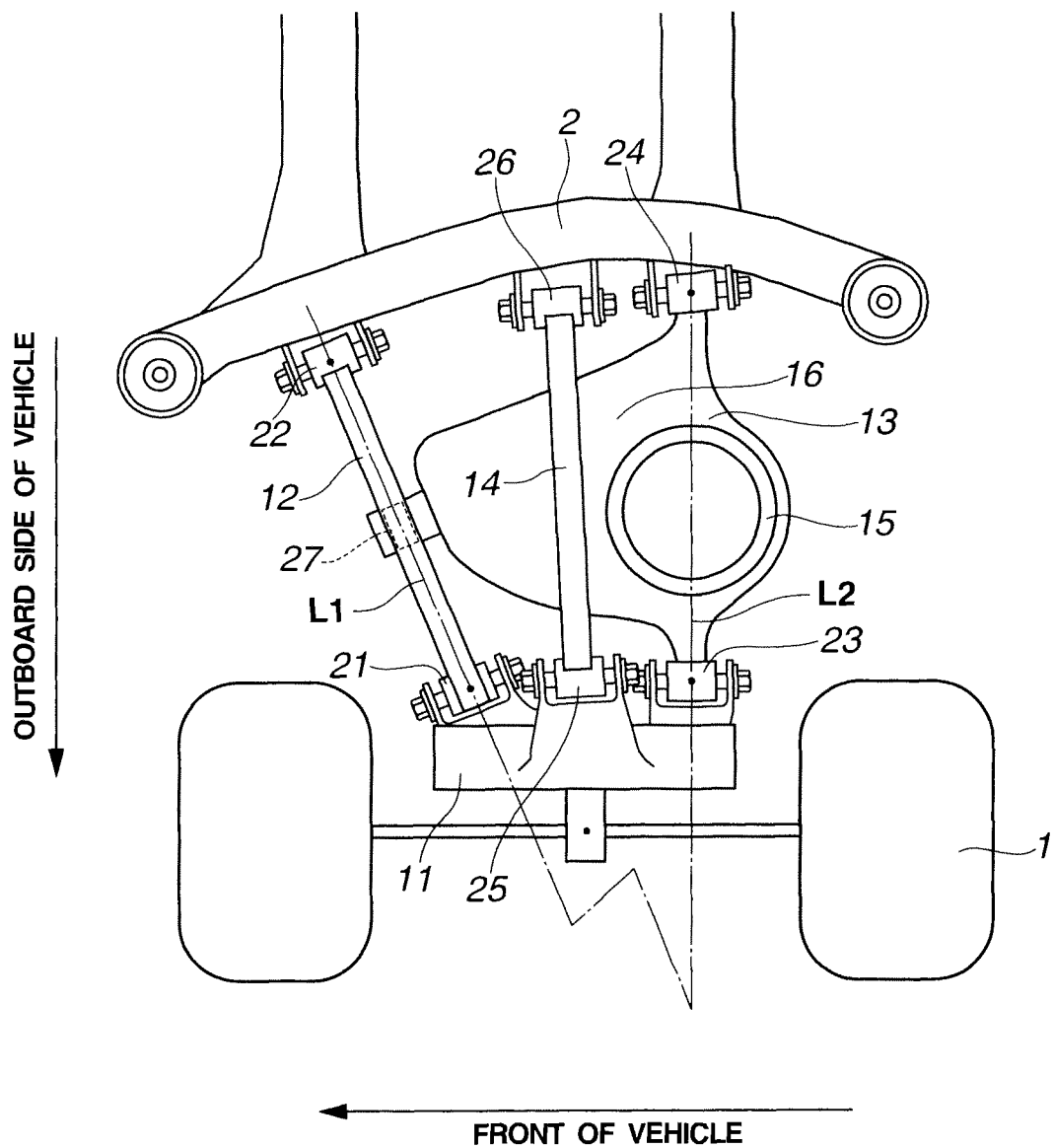
FIG. 18 a top view schematically showing a rear left wheel suspension system in a variation example according to the embodiment of the present invention.

Furthermore, although the lower front and rear links 12 and 13 are connected through two of the connect bushes 27 and 28 in the illustrated example, it is optional to connect the lower front and rear links 12 and 13 with only one connect bush (27) as shown in a variation example of FIG. 18. This variation example, too, can provide the same effects and operations.

In a bush structure of earlier technology, an elastic member is formed with a hollow portion or relief portion extending axially through the elastic member to provide directional property in the stiffness in the direction perpendicular to the axis. However, the formation of the through hollow portion extending axially through the elastic member might cause following problems.

First, the stiffness in the angular direction perpendicular to the axis around the axis is changed sharply between the portion formed with the hollow portion and the portion formed with no hollow portion. This sharp change in the stiffness might exert influence on the steering stability and steering feeling during cornering operation. Moreover, muddy water collected in the hollow portion might make it difficult to obtain a designed deflection characteristic, and to achieve a desired compliance steer. Moreover, the hollow portion might promote progress of breakage if caused in the elastic member by unexpected chipping.

Therefore, in the bush structure according to the embodiment, the elastic member 91 of the connect bush (27, 28) is not formed with a through hollow portion passing through in the axial direction. Instead, the outer cylinder 81 is formed with the convex portions 83 projecting radially inwards from the inside circumferential surface 82 of outer cylinder 81 toward the outside circumferential surface 72 of inner cylinder 71, and the radial thickness of elastic member 91 measured in the vehicle vertical direction is made smaller than the radial thickness of elastic member 91 measured in the vehicle lateral or widthwise direction.

With the elastic member 91 configured to have the radial thickness in the vehicle vertical direction smaller than the radial thickness in the vehicle lateral direction, it is possible to make the stiffness in the vehicle vertical direction greater than the stiffness in the vehicle lateral direction. Furthermore, unlike the configuration having the hollow portion extending through the elastic member in the axial direction, it is possible to prevent a sharp variation of the stiffness in the direction perpendicular to the axis, among a sheaf of planes around the axis. Thus, this bush structure can improve the steering stability and steering feeling in cornering operation.

Figure 19:
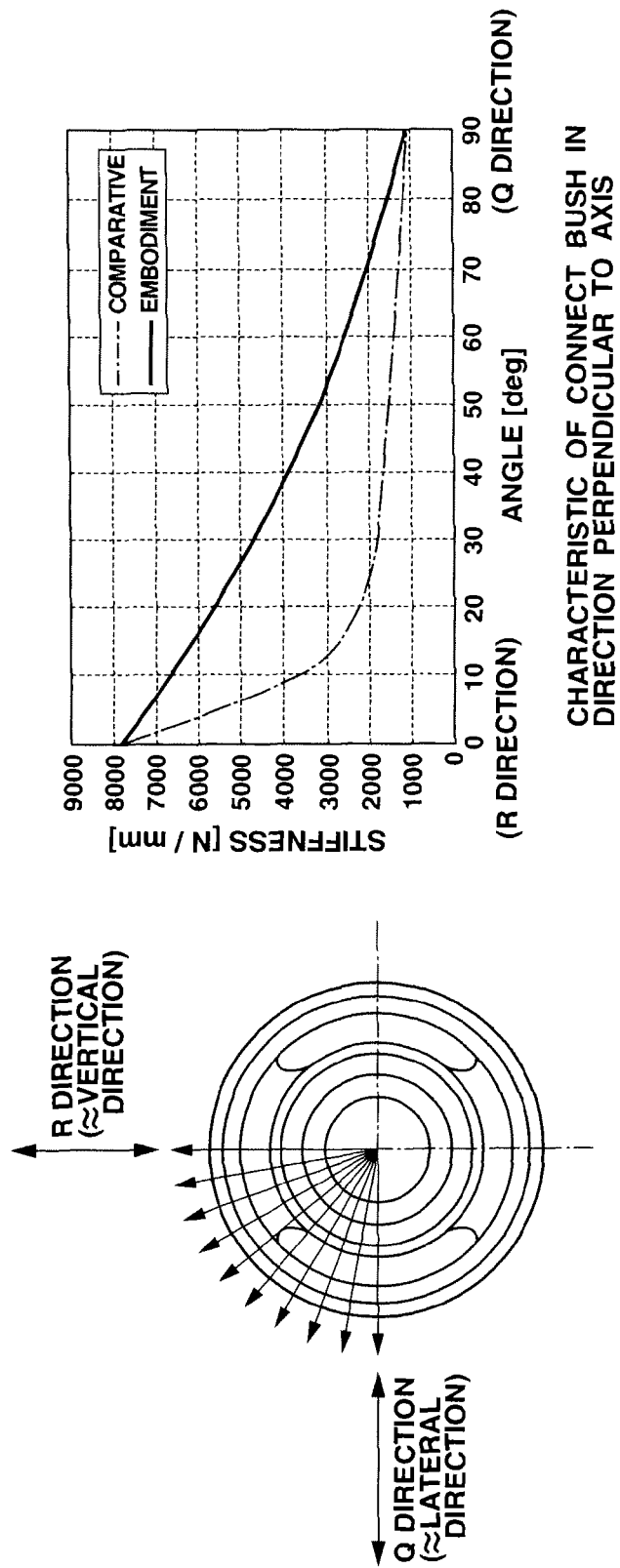
FIG. 19 shows the stiffness of the connect bush in directions perpendicular to the axis.

FIG. 19 shows the stiffness of the connect bush in the direction perpendicular to the axis in each of a sheaf of planes around the axis to show comparison of characteristics (actual measurement, analysis). In the case of the bush structure of a comparative example in which the hollow portion is formed axially through the elastic member, the stiffness is varied sharply between the portion where the hollow portion is formed and the portion where no hollow portion is formed. By contrast, in the bush structure according to the embodiment, it is possible to obtain a characteristic in which the stiffness is varied smoothly (approximately in the linear form) with the angle by making the radial wall thickness of elastic member 91 in the vehicle vertical direction smaller than the radial wall thickness in the vehicle lateral direction. Furthermore, the bush structure according to the embodiment can restrain collection of muddy water, ensure a designed deflection characteristic, and to achieve a desired compliance steer. Moreover, the bush structure does not promote progress of breakage if caused in the elastic member by unexpected chipping, unlike the bush structure of the comparative example.

The inside circumferential surface 82 of outer cylinder 81 is formed with the convex portions 83 projecting radially inwards toward the outside circumferential surface 72 of inner cylinder 71, respectively on the two opposite sides in the vehicle vertical direction (R). Therefore, even if great load is applied to the connect bush (27, 28) in the vehicle vertical direction, the convex portions 83 of outer cylinder 81 interfere with the outside circumferential surface 72 of inner cylinder 71 and thereby restrain excessive relative displacement in the vehicle vertical direction. Thus, the convex portions 83 can serve as a stopper.

In the link construction as in this embodiment, it is known that the wheel 1 moves in the vehicle longitudinal direction when a longitudinal force is inputted to wheel 1 as in a situation in which wheel 1 rides on a projection or descends a step.

Figure 20B:
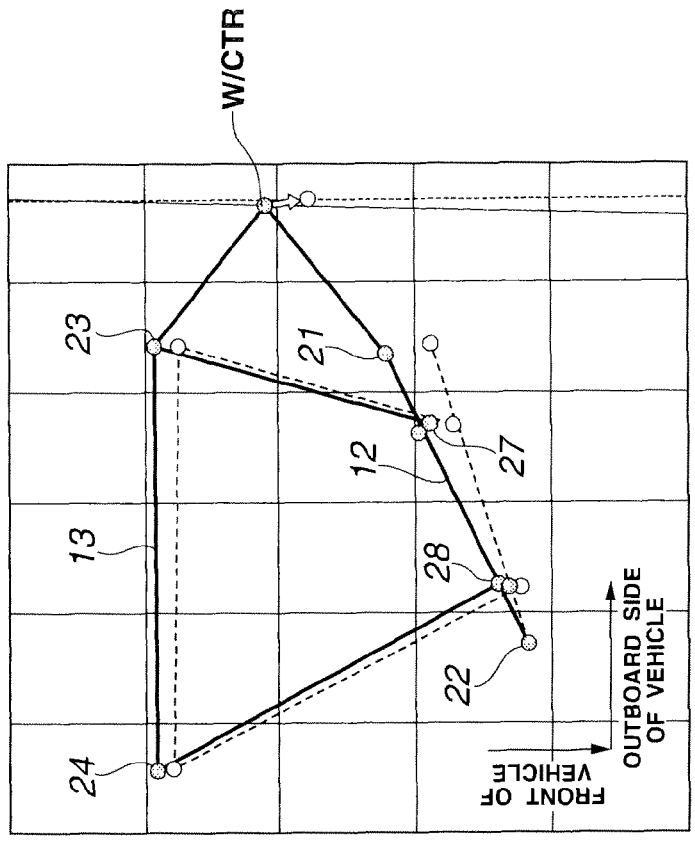
FIG. 20B is a plan view of the link arrangement.
Figure 20A:
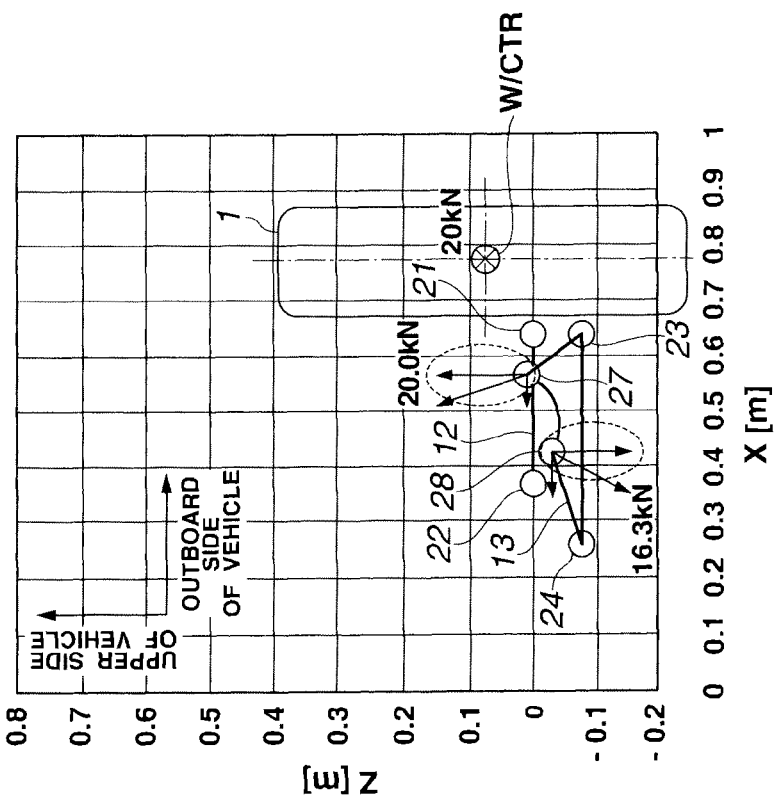
FIG. 20A is a front view of the link arrangement.

FIG. 20 shows the link state at the time of input of a longitudinal force. FIG. 20A a front view of the link arrangement, and FIG. 20B is a plan view of the link arrangement. When a longitudinal force is inputted to the wheel center of wheel 1 to the rear side of the vehicle body, a vertical force in the vehicle vertical direction is applied to each of the connect bushes 27 and 28. With these vertical forces applied to connect bushes 27 and 28, as shown in FIG. 20B, the lower front and rear links 12 and 13 are displaced from the position shown by a solid line to the position shown by a dotted line, toward the front of the vehicle, that is. Thus, one of main factors causing displacement of wheel 1 in the vehicle longitudinal direction in the case of input of a longitudinal force is excessive swing motion in the vehicle vertical direction at the connect bushes 27 and 28.

Figure 21:
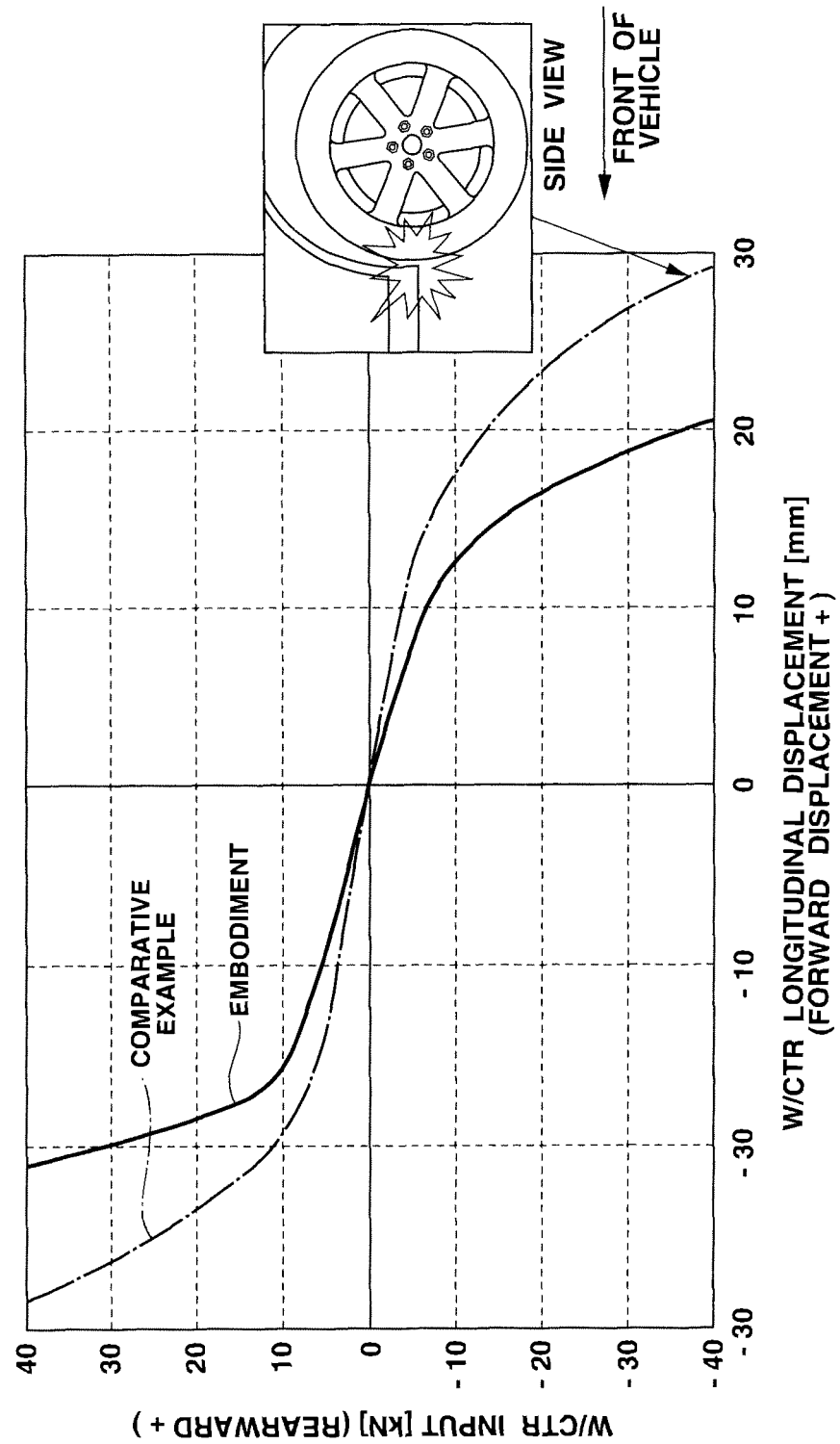
FIG. 21 is a view showing a longitudinal displacement quantity of a wheel with respect to an input of a longitudinal force.

FIG. 21 shows a longitudinal displacement quantity of a wheel with respect to an input of a longitudinal force. FIG. 21 shows a characteristic of a comparative example having no measure to stop relative displacement between inner and outer cylinders 71 and 81 in the vehicle vertical direction, for comparison by a two-dot chain line. FIG. 21 shows, by a solid line, a characteristic of the illustrated example of the embodiment in which the relative displacement between inner and outer cylinders 71 and 81 in the vehicle vertical direction is limited by the abutment between the outside circumferential surface 72 and the convex portions 81.

In both of the comparative example and the illustrated example of the embodiment, the displacement of wheel 1 (wheel center W/CTR) in the vehicle longitudinal direction is increased with increase in the input longitudinal force. However, in the case of the embodiment, the suspension system can restrain excessive relative displacement between inner and outer cylinder 71 and 81 in the vehicle vertical direction by abutment of the convex portions 83 against the outside circumferential surface 72, as mentioned before, and thereby prevent the wheel 1 from being displaced greatly in the vehicle forward direction. Thus, the suspension system can avoid contact between wheel 1 and the vehicle body, securely.

Figure 22:
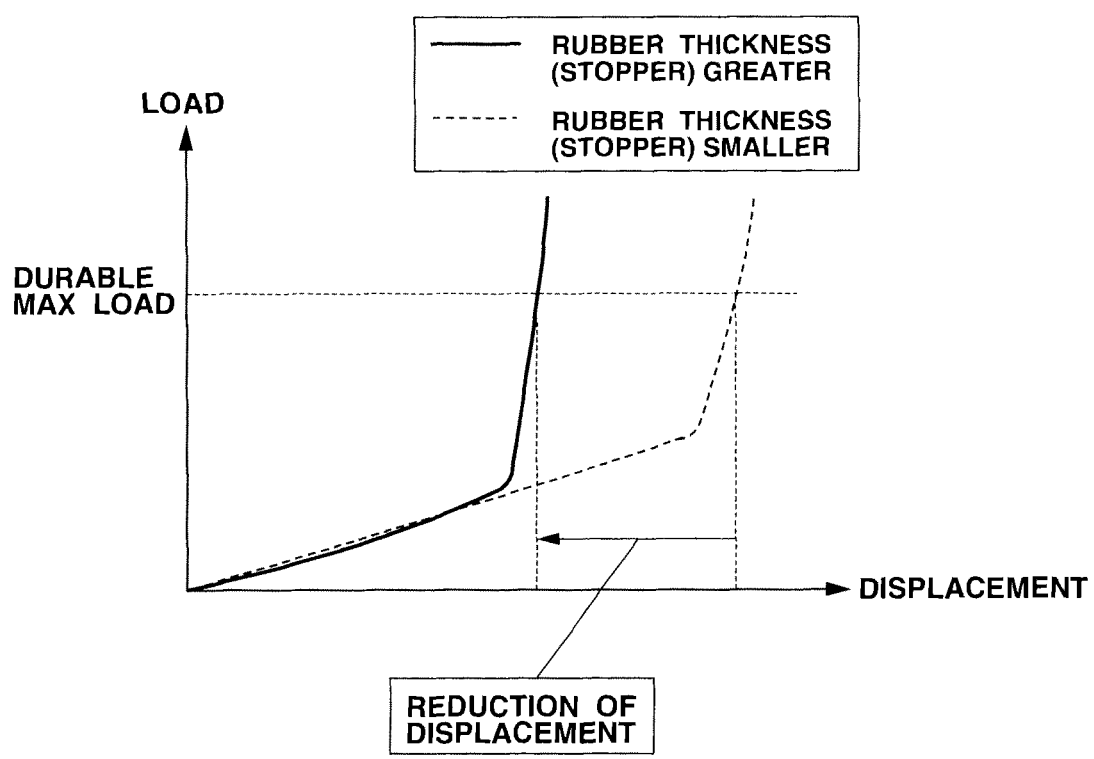
FIG. 22 is a view showing a relationship, in the elastic member, between displacement and load.

FIG. 22 shows a relationship in the elastic member between displacement and load. With the elastic member 91 having the radial thickness in the vehicle vertical direction made smaller, the load rises quickly in the case of input of durable load. Therefore, the suspension system can restrain displacement, decrease the endurance stress, and hence improve the durability of the connect bush (27, 28). Thus, it is possible to reduce the displacement with respect to a durable max load because the load rises earlier.

The convex portions 83 are formed in outer cylinder 71 after elastic member 91 is formed between inner and outer cylinders 71 and 81. Therefore, elastic member 91 is made more dense in the region between the convex portion 83 of outer cylinder 81 and the outside circumferential surface 72 of inner cylinder 71 than in the other region. Therefore, the stiffness is increased in the vehicle vertical direction.

Two cut surfaces 73 extending substantially in parallel to the vehicle vertical direction are formed in the outside circumferential surface 72 of inner cylinder 71, respectively at two positions on the opposite sides in the vehicle lateral direction. With the cut surfaces 73, it is possible to increase the radial thickness in the vehicle widthwise direction in inner cylinder 71. Thus, it is possible to decrease the stiffness of elastic member 91 in the vehicle lateral direction.

<Variation Examples of Convex Portions>

In the illustrated example of the embodiment, the convex portions 83 are formed in the inside circumferential surface 82 of outer cylinder 81. However, it is optional to form convex portion or portions in the outside circumferential surface 72 of inner cylinder 71 as in following variations examples.

Figure 23A:
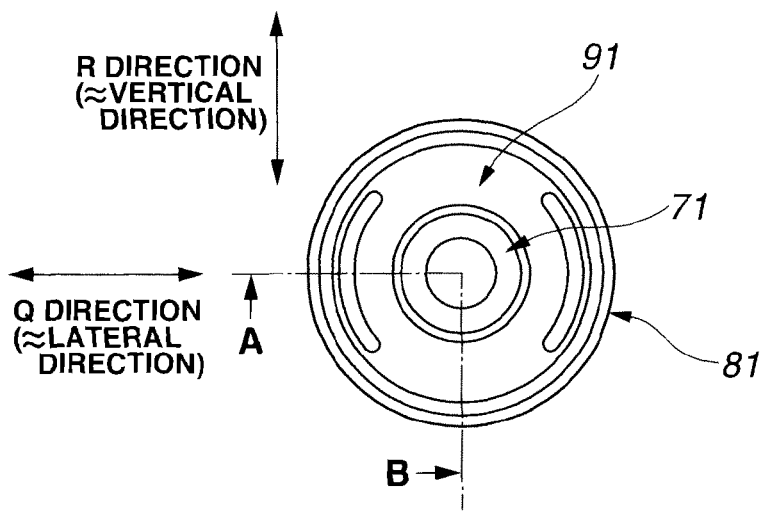
FIG. 23A is a top view of the connect bush.
Figure 23C:
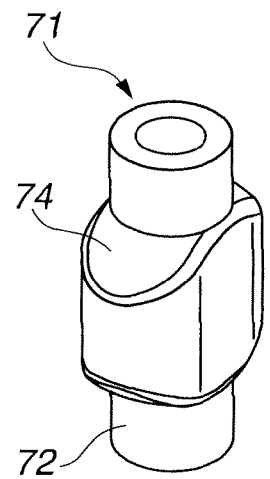
FIG. 23C is a perspective view of the inner cylinder.
Figure 23B:
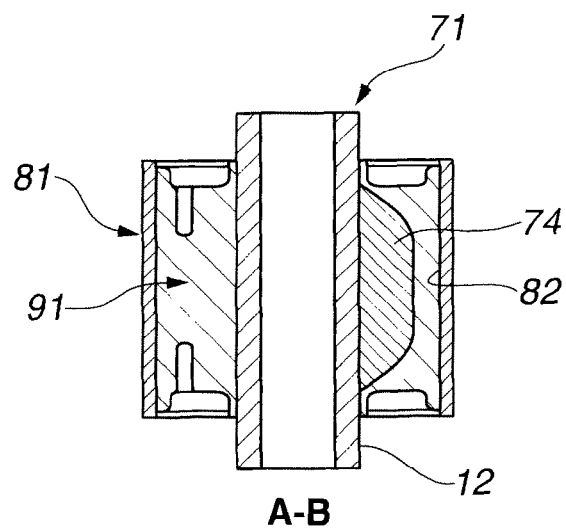
FIG. 23B is a longitudinal sectional view taken across a line A-B in FIG. 23A.

FIG. 23 shows a first variation example of the convex portions. FIG. 23A is top view of connect bush 27, FIG. 23B is a longitudinal sectional view taken across a line A-B in FIG. 23A, and FIG. 23C is a perspective view of inner cylinder 71. The outside circumferential surface 72 of inner cylinder 71 may be formed with at least one convex portion 74 of different material projecting radially outwards toward the inside circumferential surface 82 of outer cylinder 81. In this example, the convex portion or portions 74 are formed resin by vulcanization.

FIG. 24 shows a second variation example of the convex portions. FIG. 24A is top view of connect bush 27, FIG. 24B is a longitudinal sectional view taken across a line A-B in FIG. 24A, and FIG. 24C is a perspective view of inner cylinder 71. The outside circumferential surface 72 of inner cylinder 71 is formed with at least one convex portion 75 projecting radially outwards toward the inside circumferential surface 82 of outer cylinder 81. In this example, the convex portion or portions 75 are formed by bulge forming operation to deform the circumferential wall of inner 71 in a bulging form from the inside of inner cylinder 71.

FIG. 25 shows a third variation example of the convex portions. FIG. 25A is top view of connect bush 27, FIG. 25B is a longitudinal sectional view taken across a line A-B in FIG. 25A, and FIG. 25C is a perspective view of inner cylinder 71. The outside circumferential surface 72 of inner cylinder 71 is formed with at least one convex portion 76 projecting radially outwards toward the inside circumferential surface 82 of outer cylinder 81. In this example, the convex portion or portions 76 are formed by forging. In this example, two of the convex portions 76 are formed by forging at two positions on the opposite sides in the vehicle vertical direction at or about an axial middle of the outside circumferential surface 72 in the axial direction. Moreover, the outside circumferential surface 72 of inner cylinder 71 is further formed with cut surfaces 73 extending substantially in parallel to the vehicle vertical direction, at two positions in the vehicle lateral direction.

FIG. 26 shows a fourth variation example of the convex portions. FIG. 26A is top view of connect bush 27, FIG. 26B is a longitudinal sectional view taken across a line A-B in FIG. 26A, and FIG. 26C is a perspective view of inner cylinder 71. The outside circumferential surface 72 of inner cylinder 71 is formed with at least one convex portion 76 projecting radially outwards toward the inside circumferential surface 82 of outer cylinder 81, by forging. In this example, two of the convex portions 76 are formed by forging at two positions on the opposite sides in the vehicle vertical direction, over an axial range extending from a position at or near one axial end of the inner cylinder 71 to a position at or near the other axial end.

FIG. 27 shows a fifth variation example of the convex portions. FIG. 27A is top view of connect bush 27, FIG. 27B is a longitudinal sectional view taken across a line A-B in FIG. 27A, and FIG. 27C is a perspective view of inner cylinder 71. The outside circumferential surface 72 of inner cylinder 71 is formed with at least one convex portion 76 projecting radially outwards toward the inside circumferential surface 82 of outer cylinder 81. In this example, the convex portion or portions 76 are formed by forging. In this example, two of the convex portions 76 are formed by forging at two positions on the opposite sides in the vehicle vertical direction at or about an axial middle of the outside circumferential surface 72 in the axial direction.

These variation examples can provide the same effects and operation as in the illustrated example of the embodiment.

<Effects>

(1) In the suspension system according to the embodiment, a bush (such as link bush 23 or 24) includes an inner cylinder (41; 51) including an outside circumferential surface (44; 54) formed with a bulge portion (46; 56) bulging radially outwards in a central region between both axial ends. With the bulge portion (46; 56), in the case of relative displacement in the axial direction of the bush between the inner cylinder (41; 51) and the outer cylinder (42; 52), an elastic member (43; 53) is subjected to not only deformation in the shearing direction, but also compressive deformation in the axial direction. Therefore, this suspension system makes it possible to increase the stiffness in the axial direction of the bush (23; 24) while decreasing the stiffness in the twisting direction. Therefore, it is possible to shift the resonance point in the deformation mode in the axial direction to the higher frequency side and thereby to improve the performance of sound and vibration.

(2) In the suspension system according to the embodiment, the inside circumferential surface (45; 55) of the outer cylinder (42; 52) of the bush (23; 24) includes a concave surface confronting the bulge portion or tightly covering the bulge portion (46; 56) of the inner cylinder (41; 51) through the elastic member. Therefore, an axial displacement between the inner cylinder (41; 51) and the outer cylinder (42; 52) causes not only deformation of the elastic member (43; 53) in the shearing direction, but also compressive deformation in the axial direction. Consequently, it is possible to decrease the stiffness of the bush (23; 24) in the twisting direction and simultaneously increasing the stiffness in the axial direction. Accordingly, it is possible to shift the resonance point in the axial deformation mode to the higher frequency side, and improve the sound and vibration performance.

(3) In the suspension system according to the embodiment, the inner cylinder (41; 51) of the bush (23; 24) includes an enlarged portion (47; 57) formed at each of the axial ends of the outside circumferential surface (44; 54). The enlarged portion (47; 57) at each end functions to increase the area of the end surface and thereby to decrease the surface pressure in the end surface in the state in which the inner cylinder (41; 51) is connected with another member.

(4) In the suspension system according to the embodiment, the elastic member (43; 53) of the bush (23; 24) extends axially on the outside circumferential surface (44; 54) of the inner cylinder from the position of the enlarged portion (47; 57) at one axial end to the position of the enlarged portion (47; 57) at the other axial end. Therefore, when the inner cylinder (41; 51) and the outer cylinder (42; 52) are displaced relative to each other in the twisting direction S, the elastic member (43; 53) functions to prevent direct interference or direct contact between bent portions (48; 58) of the outer cylinder and the enlarged portions of the inner cylinder. In the illustrated example, the outside circumference of the inner cylinder (41; 51) includes a first annular recess formed between the central bulge portion (46; 56) and the enlarged portion (47; 57) at one axial end, and a second annular recess formed between the central bulge portion (46; 56) and the enlarged portion (47; 57) at the other axial end. The elastic member (43; 53) includes a first end portion formed (fittingly) in the first annular recess and a second end portion formed (fittingly) in the second annular recess. The outer cylinder (42; 52) is shorter in the axial length than the elastic member (43; 53) (which is shorter in the axial length than the inner cylinder (42; 52)), and the outer cylinder (42, 52) terminates at the axial position in the range of the first or second annular recess of the inner cylinder at each of the axial ends (5) In the suspension system according to the embodiment, a connect bush (27; 28) for connection between the front and rear suspension links includes an elastic member (91) which has a stiffness in the vehicle lateral direction lower than a stiffness in the vehicle vertical or up and down, direction. With this anisotropic elastic member (91), the lower front link 12 tends to deform in the axial direction along the straight line L1 when a longitudinal force is applied at the time of braking, and hence secure the tendency to toe-in.

(6) In the suspension system according to the embodiment, a front bracket (33) of lower rear link 13 includes an outer bracket (35) and an inner bracket (36) which are both fixed, at both of upper and lower ends, to upper and lower brackets (32, 13) of the lower rear link (13). One of the inner and outer cylinders (71, 81) of the connect bush (27, 28) is connected, through a connection pin (34), to both of the outer and inner brackets (35, 36). This arrangement can increase the rigidity locally in the connection between the front bracket and the lower rear link with respect to load applied to the connect bush (27, 28) in the axial direction and the direction perpendicular to the axis. Therefore, it is possible to secure the toe-in characteristic effectively with respect to a longitudinal force at the time of braking, hence to improve the directional stability, and to improve the resonance characteristic by increasing the front and rear resonance frequency.

(7) The suspension system according to the embodiment includes at least one connect bush (27, 28) which has an axis extending along the vehicle longitudinal direction, and which is arranged to connect the front suspension link (12) and the rear suspension link (13) with each other. The radial thickness of the elastic member (91) in the vehicle vertical direction (vertical direction or first perpendicular direction R) is made smaller than the radial thickness of the elastic member in the vehicle lateral or widthwise direction (side direction or second perpendicular direction (Q)) extending from the vehicle body member toward the wheel support member, by at least one convex portion (83; 74, 75, 76) which projects from one of the inside circumferential surface (82) of the outer cylinder and the outside circumferential surface (72) of the inner cylinder (71) toward the other.

With the thus-constructed elastic member (91) having a circumferential wall whose radial thickness is smaller in the vehicle vertical direction and larger in the vehicle lateral direction, the suspension system makes it possible to increase the stiffness in the vehicle vertical direction as compared to the stiffness in the vehicle lateral direction. Moreover, unlike the suspension system employing the elastic member formed with the hollow portion extending axially through the elastic member, it is possible to prevent sharp variation in the stiffness in the circumferential direction around the axis, and hence to improve the steering stability and steering feeling during cornering operation.

(8) In the suspension system according to the embodiment, the convex portion (83) is formed by forming a concave portion (85) depressed from an outside circumferential surface (84) of the outer cylinder (81) of the connect bush (27, 28) toward the inner cylinder (71) radially inwards in the vehicle vertical direction (vertical direction R), at a middle portion, in the axial direction, of the outer cylinder (81). With this simple construction, it is possible to facilitate the production process and prevent increase of the production cost.

(9) In the suspension structure according to the embodiment, the convex portion (83) is formed by depressing the concave portion from the outside circumferential surface (84) of the outer cylinder (81) of the connect bush (27, 28) to deform the elastic member (91) after the elastic member (91) is interposed between the inner and outer cylinders (71, 81). In this way, the convex portion (83) is formed in the outer cylinder (81) in the state in which the elastic member (91) is filled and disposed tightly between the inner and outer cylinders (71, 81), and hence the elastic member (91) is deformed so that the portion of the elastic member (91) pressed by the convex portion (83) is made more dense, and it becomes possible to increase the stiffness in the vehicle vertical direction.

(10) In the suspension system according to the embodiment, the inner cylinder of the connect bush (27, 28) includes a pair of cut surfaces (73) formed in the outside circumferential surface (72) of the inner cylinder (71), and arranged to extend in the vehicle vertical direction (vertical direction R) at two diametrically opposite positions in the vehicle lateral direction (side direction (Q)). With the cut surfaces (73) such as two parallel flat surfaces extending substantially in parallel to the vehicle vertical direction, it is possible to increase the radial thicken of the inner cylinder 71 in the vehicle lateral direction and thereby to decrease the stiffness of the elastic member (91) in the vehicle lateral direction. Moreover, the cut surfaces (73) facilitate a positioning operation with respect to a jig in the production process of the connect bush (27, 28).

(11) In a bush structure according to the embodiment, a bush (23; 24) comprises an inner cylinder (41; 51) including an outside circumferential surface (44; 54) formed with a bulge portion (46; 56) bulging radially outwards in a central region between both axial ends, and enlarged portions (47; 57) enlarged radially outwards (like an outward flange, for example); an outer cylinder (42; 52) including an inside circumferential surface (45; 55) which includes a concave surface confronting the bulge portion of the inner cylinder (or covering the bulge portion of the inner cylinder through the elastic member); and an elastic member (43; 53) including a central portion covering the bulge portion of the inner cylinder, and first and second end portions extending axially, respectively, to the enlarged portions of the inner cylinder.

With this bush structure, in the case of relative displacement in the axial direction between the inner cylinder (41; 51) and the outer cylinder (42; 52), the elastic member (43; 53) is subjected to not only deformation in the shearing direction, but also compressive deformation in the axial direction. Therefore, this bush structure makes it possible to increase the stiffness in the axial direction of the bush (23; 24) while decreasing the stiffness in the twisting direction. Therefore, it is possible to shift the resonance point in the deformation mode in the axial direction to the higher frequency side and thereby to improve the performance of sound and vibration. Furthermore, the enlarged portion (47; 57) at each end functions to increase the area of the end surface and thereby to decrease the surface pressure in the end surface in the state in which the inner cylinder (41; 51) is connected with another member. Moreover, the elastic member (43; 53) functions to prevent direct interference or direct contact between end portions (or bent portions) (48; 58) of the outer cylinder and the enlarged portions of the inner cylinder in the case of relative displacement between the inner and outer cylinders in the twisting direction S.

(12) In a suspension characteristic adjusting method (or production method) according to the embodiment, a bush (23; 24) includes an inner cylinder (41; 51) including an outside circumferential surface (44; 54) formed with a bulge portion (46; 56) bulging radially outwards in a central region between both axial ends. With the bulge portion (46; 56), in the case of relative displacement in the axial direction between the inner cylinder (41; 51) and the outer cylinder (42; 52), an elastic member (43; 53) is subjected to not only deformation in the shearing direction, but also compressive deformation in the axial direction. Therefore, this suspension characteristic adjusting method makes it possible to increase the stiffness in the axial direction of the bush (23; 24) while decreasing the stiffness in the twisting direction. Therefore, it is possible to shift the resonance point in the deformation mode in the axial direction to the higher frequency side and thereby to improve the performance of sound and vibration.

(13) A bush structure (27, 28) according to the embodiment includes at least one connect bush (27, 28) which has an axis extending along the vehicle longitudinal direction, and which is arranged to connect a front suspension link (12) and a rear suspension link (13) with each other. The radial thickness of an elastic member (91) in the vehicle vertical direction (vertical direction R) is made smaller than the radial thickness of the elastic member in the vehicle lateral or widthwise direction (side direction (Q)) extending from the vehicle body member toward the wheel support member, by at least one convex portion (83; 74, 75, 76) which projects from one of the inside circumferential surface (82) of the outer cylinder and the outside circumferential surface (72) of the inner cylinder (71) toward the other.

With the thus-constructed elastic member (91) having a circumferential wall whose radial thickness is smaller in the vehicle vertical direction and larger in the vehicle lateral direction, the suspension system makes it possible to increase the stiffness in the vehicle vertical direction as compared to the stiffness in the vehicle lateral direction. Moreover, unlike the suspension system employing the elastic member formed with the hollow portion extending axially through the elastic member, In this way, it is possible to prevent sharp variation in the stiffness in the circumferential direction around the axis, and hence to improve the steering stability and steering feeling during cornering operation.

(14) In a suspension characteristic adjusting method (or production method) according to the embodiment, a connect bush (27, 28) is formed by an inner cylinder (71) extending in the vehicle longitudinal direction, an outer cylinder (81) surrounding the inner cylinder and an elastic member (91) disposed radially between the inner and outer cylinders. The radial thickness of the elastic member (91) in the vehicle vertical direction (vertical direction R) is made smaller than the radial thickness of the elastic member in the vehicle lateral or widthwise direction (side direction (Q)), by forming at least one convex portion (83; 74, 75, 76) which projects from one of the inside circumferential surface (82) of the outer cylinder and the outside circumferential surface (72) of the inner cylinder (71) toward the other, and which is formed in one (82) of the inside circumferential surface (82) of the outer cylinder (81) and the outside circumferential surface (72) of the inner cylinder (71).

According to a first aspect of the embodiment of the present invention, a suspension system comprises a basic structure comprising: front and rear suspension links (12, 13) arranged to connect a wheel support member (11) adapted to support a wheel (1) and a vehicle body member (2) swingably; and a connect bush (27, 28) to connect the front suspension link and the rear suspension link with each other. The connect bush includes: an inner cylinder (71) connected with one of the front and rear suspension links; an outer cylinder (81) connected with the other of the front and rear suspension links, and an elastic member (91) interposed (or fit tightly or filled) between the inner cylinder and the outer cylinder. The connect bush extends in an axial direction (P) from a rear end to a front end located on the front side of the rear end of the connect bush in a front and rear direction (or in a vehicle longitudinal direction), and the elastic member is configured to have a stiffness higher in a vertical direction (R) which is a direction perpendicular to the axial direction of the connect bush, and lower in a horizontal (side) direction (Q) which is a direction perpendicular to the axial direction of the connect bush and perpendicular to the vertical direction. Preferably, a radial thickness of the elastic member (91) in the vertical direction (R) is made smaller than a radial thickness of the elastic member in the horizontal (side) direction (Q) extending from the vehicle body member toward the wheel support member, by a convex portion (83; 74, 75, 76) which is formed in one (82) of the inside circumferential surface (82) of the outer cylinder (81) and the outside circumferential surface (72) of the inner cylinder (71) and which projects from the one of the inside circumferential surface of the outer cylinder and the outside circumferential surface of the inner cylinder toward the other.

According to a second aspect of the embodiment of the present invention, a suspension system comprises a basic structure comprising: front and rear suspension links (12, 13) arranged to connect a wheel support member (11) adapted to support a wheel (1) and a vehicle body member (2) swingably; and a link bush (21~24) to connect one of the suspension links with a link support member which is one of the wheel support member and the vehicle body member. The link bush includes: an inner cylinder (41, 51) which extends in a front and rear direction (or in a vehicle longitudinal direction) and which is connected with one of the corresponding suspension link and the link support member; an outer cylinder (42, 52) which includes an inside circumferential surface (45, 55) confronting an outside circumferential surface (44, 54) of the inner cylinder of the link bush and which is connected with the other of the corresponding suspension link and the link support member; and an elastic member (43, 53) interposed (or fit tightly or filled) between the inner cylinder and the outer cylinder of the link bush. The inner cylinder (41, 51) is formed with a (central) bulge portion (46, 56) which projects or bulges radially outwards from the outside circumferential surface (44, 54) of the inner cylinder (41, 51) of the link bush at a middle or central portion of the inner cylinder in an axial direction of the inner cylinder of the link bush between both axial ends.

According to a third aspect of the embodiment of the present invention, a bush structure comprises: an inner cylinder extending in an axial direction; an outer cylinder which includes an inside circumferential surface confronting an outside circumferential surface of the inner cylinder; and an elastic member interposed (or filled or fit tightly) between the inner cylinder and the outer cylinder. A radial thickness of the elastic member in a vertical direction (R) (first perpendicular direction) is made smaller than a radial thickness of the elastic member in a horizontal (side) direction (Q) (second perpendicular direction), by a convex portion which projects from one of the inside circumferential surface of the outer cylinder and the outside circumferential surface of the inner cylinder toward the other.

According to a fourth aspect of the embodiment of the present invention, a bush structure comprises: an inner cylinder; an outer cylinder surrounding the inner cylinder; and an elastic member interposed radially (or filled or fit tightly) between the inner cylinder and the outer cylinder. The inner cylinder includes a central bulge portion which bulges radially outwards from an outside circumferential surface of the inner cylinder at a middle or central portion of the inner cylinder in an axial direction of the inner cylinder. The outer cylinder includes a concave inside circumferential surface facing radially inwards toward the bulge portion of the inner cylinder and covering the elastic member filled between the concave inside circumferential surface of the outer cylinder and a convex outside circumferential surface of the bulge portion of the inner cylinder.

According to a fifth aspect of the embodiment of the present invention, a suspension characteristic adjusting method (or suspension structure producing method) comprises: connecting a wheel support member supporting a wheel and a vehicle body member swingably with front and rear suspension links; connecting the front suspension link and the rear suspension link with a connect bush including an inner cylinder connected with one of the front and rear suspension links, an outer cylinder which includes an inside circumferential surface confronting an outside circumferential surface of the inner cylinder and which is connected with the other of the front and rear suspension links, and an elastic member interposed between the inner cylinder and the outer cylinder; and making a radial thickness of the elastic member in a vertical direction smaller than a radial thickness of the elastic member in a horizontal side direction extending from the vehicle body member toward the wheel support member, by forming a convex portion which projects from one of the inside circumferential surface of the outer cylinder and the outside circumferential surface of the inner cylinder toward the other.

According to a sixth aspect of the embodiment of the present invention, a suspension characteristic adjusting method (or suspension structure producing method) comprises: connecting a wheel support member supporting a wheel and a vehicle body member swingably with front and rear suspension links by using at least one rear link bush including an inner cylinder which extends in a front and rear direction and which is connected with one of the rear suspension link and a link support member which is one of the wheel support member and the vehicle body member, an outer cylinder which includes an inside circumferential surface confronting an outside circumferential surface of the inner cylinder of the link bush and which is connected with the other of the suspension link and the link support member, and an elastic member interposed between the inner cylinder and the outer cylinder of the link bush; and forming a bulge portion which projects radially outwards from the outside circumferential surface of the inner cylinder of the link bush at a middle or central portion of the inner cylinder in an axial direction of the inner cylinder of the link bush.

The transverse direction of the suspension structure or system is substantially identical to, or coincident with, the vehicle lateral or widthwise direction, and the front and rear direction is substantially identical to, or coincident with, the vehicle longitudinal direction in the installed state in which the suspension structure is installed in a vehicle.

This application is based on a first prior Japanese Patent Application No. 2011-109664 filed on May 16, 2011, and a second prior Japanese Patent Application No. 2011-109668 filed on May 16, 2011. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A suspension structure comprising:
   front and rear suspension links configured to swingably connect (i) a wheel support member configured to support a wheel, and (ii) a vehicle body member; and
   a bush configured to connect (i) a first member, which is one of the front and rear suspension links, with (ii) a second member, which is the other of the front and rear suspension links, or a link support member which is one of the wheel support member and the vehicle body member,
   wherein the bush comprises:
      an inner cylinder connected with one of the first and second members,
      an outer cylinder which includes an inside circumferential surface confronting an outside circumferential surface of the inner cylinder of the bush and which is connected with the other of the first and second members,
      an elastic member interposed between the inner cylinder and the outer cylinder of the bush, and
      a protruding portion which protrudes from one of the inside circumferential surface of the outer cylinder and the outside circumferential surface of the inner cylinder toward the other to compress the elastic member,
   wherein the protruding portion compresses the elastic member such that an elastic force of the elastic member in a vertical direction is greater than an elastic force of the elastic member in a side direction.

2. The suspension structure as claimed in claim 1, wherein the bush is a connect bush configured to connect the front suspension link and the rear suspension link with each other,
   the inner cylinder of the connect bush is connected with one of the front and rear suspension links, and the outer cylinder of the connect bush is connected with the other of the front and rear suspension links, the protruding portion compresses the elastic member such that a radial thickness of the elastic member in the vertical direction is smaller than a radial thickness of the elastic member in the side direction, and the protruding portion includes a convex portion which protrudes from one of the inside circumferential surface of the outer cylinder and the outside circumferential surface of the inner cylinder toward the other.

3. The suspension structure as claimed in claim 2, wherein:
the rear suspension link extends in a transverse direction from one of the vehicle body member and the wheel support member toward the other of the vehicle body member and the wheel support member,
the front suspension link extends along the rear suspension link on a front side of the rear suspension link in a front and rear direction,
the connect bush extends in an axial direction from a rear end of the connect bush to a front end of the connect bush,
the vertical direction is perpendicular to the axial direction of the connect bush, and
the side direction is perpendicular to the axial direction of the connect bush and perpendicular to the vertical direction.

4. The suspension structure as claimed in claim 3, wherein the convex portion is formed by forming a concave portion depressed from an outside circumferential surface of the outer cylinder of the connect bush toward the inner cylinder radially inwards in the vertical direction, at a middle, in the axial direction, of the outer cylinder.

5. The suspension structure as claimed in claim 4, wherein the convex portion is formed by depressing the concave portion from the outside circumferential surface of the outer cylinder of the connect bush to deform the elastic member in a state in which the elastic member is interposed between the inner and outer cylinders.

6. The suspension structure as claimed in claim 3, wherein the inner cylinder of the connect bush includes a pair of cut surfaces formed in the outside circumferential surface of the inner cylinder, and arranged to extend in the vertical direction at two diametrically opposite positions in the side direction.

7. The suspension structure as claimed in claim 3, wherein:
the rear suspension link includes:
a frame including a lower wall and an upper wall, and
a front bracket including (i) an outer wall extending from a lower end fixed to the lower wall of the frame to an upper end fixed to the upper wall of the frame, and (ii) an inner wall extending from a lower end fixed to the lower wall of the frame to an upper end fixed to the upper wall of the frame,
wherein the outer wall and the inner wall are arranged in the front and rear direction such that the outer wall is located on the front side of the inner wall, and the outer wall and the inner wall are both connected with one of the inner cylinder and outer cylinder of the connect bush.

8. The suspension structure as claimed in claim 3, wherein:
the suspension structure further comprises a rear link bush configured to connect (i) the rear suspension link with (ii) the link support member, which is one of the wheel support member and the vehicle body member, and
the rear link bush includes:
an inner cylinder which extends in the front and rear direction and which is connected with one of the rear suspension link and the link support member,
an outer cylinder which includes an inside circumferential surface confronting an outside circumferential surface of the inner cylinder of the link bush and which is connected with the other of the rear suspension link and the link support member,
an elastic member interposed between the inner cylinder and the outer cylinder of the link bush, and
a bulge portion which projects radially outwards from the outside circumferential surface of the inner cylinder of the link bush at a middle portion of the inner cylinder in an axial direction of the inner cylinder of the link bush.

9. The suspension structure as claimed in claim 8, wherein the inside circumferential surface of the outer cylinder of the link bush includes a concave surface confronting the bulge portion of the inner cylinder of the link bush.

10. The suspension structure as claimed in claim 8, wherein the inner cylinder of the link bush extends axially from a first enlarged end portion enlarged radially outwards to a second enlarged end portion enlarged radially outwards.

11. The suspension structure as claimed in claim 10, wherein:
the elastic member of the link bush includes:
a central portion covering the bulge portion,
a first end portion extending axially between the first enlarged end portion and the bulge portion, and
a second end portion extending axially between the second enlarged end portion and the bulge portion.

12. The suspension structure as claimed in claim 2, wherein:
the elastic member is fit tightly between the inner cylinder and the outer cylinder, and
the convex portion projects from the inside circumferential surface of the outer cylinder toward the outside circumferential surface of the inner cylinder.

13. A suspension structure comprising:
front and rear suspension links configured to swingably connect (i) a wheel support member configured to support a wheel, and (ii) a vehicle body member; and
a connect bush configured to connect (i) one of the front and rear suspension links, with (ii) the other of the front and rear suspension links,
wherein the rear suspension link extends in a transverse direction from one of a vehicle body member and a wheel support member toward the other of the vehicle body member and the wheel support member,
wherein the front suspension link extends along the rear suspension link on a front side of the rear suspension link in a front and rear direction, and
wherein the bush comprises:
an inner cylinder connected with one of the front and rear suspension links,
an outer cylinder which includes an inside circumferential surface confronting an outside circumferential surface of the inner cylinder of the bush and which is connected with the other of the front and rear suspension links,
an elastic member interposed between the inner cylinder and the outer cylinder of the bush, and
a protruding portion which protrudes from one of the inside circumferential surface of the outer cylinder and the outside circumferential surface of the inner cylinder toward the other to compress the elastic member,
wherein the protruding portion compresses the elastic member such that a radial thickness of the elastic member in a vertical direction is smaller than a radial thickness of the elastic member in a side direction, wherein the protruding portion includes a convex portion which protrudes from one of the inside circumferential surface of the outer cylinder and the outside circumferential surface of the inner cylinder toward the other, and wherein the connect bush extends in an axial direction from a rear end of the connect bush to a front end of the connect bush, wherein the vertical direction is perpendicular to the axial direction of the connect bush, wherein the side direction is perpendicular to the axial direction of the connect bush and perpendicular to the vertical direction, and wherein the elastic member of the connect bush is annular and includes two thick wall portions confronting each other across the inner cylinder in the side direction and two thin wall portions which confront each other across the inner cylinder in the vertical direction, which have a wall thickness smaller than a wall thickness of the thick wall portions and which are compressed, respectively, by two of the convex portions confronting each other across the inner cylinder in the vertical direction.

14. A bush structure comprising:
an inner cylinder;
an outer cylinder surrounding the inner cylinder and including an inside circumferential surface confronting an outside circumferential surface of the inner cylinder;
an elastic member interposed between the inner cylinder and the outer cylinder of the bush; and
a protruding portion which protrudes from one of the inside circumferential surface of the outer cylinder and the outside circumferential surface of the inner cylinder toward the other to adjust a thickness of the elastic member,
wherein the protruding portion compresses the elastic member such that an elastic force of the elastic member in a first radial direction is greater than an elastic force of the elastic member in a second radial direction.

15. The bush structure as claimed in claim 14, wherein:
the inner cylinder extends in an axial direction,
the protruding portion compresses the elastic member such that a radial thickness of the elastic member in the first radial direction, which is a direction perpendicular to the axial direction is smaller than a radial thickness of the elastic member in the second radial direction, which is a direction perpendicular to the axial direction and perpendicular to the first radial direction, and
the protruding portion includes a convex portion projecting from one of the inside circumferential surface of the outer cylinder and the outside circumferential surface of the inner cylinder toward the other.

16. The bush structure as claimed in claim 15, wherein:
the elastic member is fit tightly between the inner cylinder and the outer cylinder, and
the convex portion projects from the inside circumferential surface of the outer cylinder toward the outside circumferential surface of the inner cylinder.

17. The bush structure as claimed in claim 14, wherein:
the inner cylinder includes the protruding portion, the protruding portion including a central bulge portion which bulges radially outwards from an outside circumferential surface of the inner cylinder at a middle portion of the inner cylinder in an axial direction of the inner cylinder;
the outer cylinder includes a concave inside circumferential surface facing radially inwards toward the bulge portion of the inner cylinder and covering the elastic member filled between the concave inside circumferential surface of the outer cylinder and a convex outside circumferential surface of the bulge portion of the inner cylinder.

18. A suspension characteristic adjusting method comprising:
providing front and rear suspension links configured to swingably connect (i) a wheel support member adapted to support a wheel, and (ii) a vehicle body member;
connecting (i) a first member, which is one of the front and rear suspension links, with (ii) a second member, which is the other of the front and rear suspension links, or a link support member which is one of the wheel support member and the vehicle body member, via a bush, the bush including:
an inner cylinder configured to be connected with one of the first and second members,
an outer cylinder which includes an inside circumferential surface confronting an outside circumferential surface of the inner cylinder of the bush and which is configured to be connected with the other of the first and second members, and
an elastic member interposed between the inner cylinder and the outer cylinder of the bush; and
adjusting a thickness of the elastic member by forming a protruding portion which protrudes from one of the inside circumferential surface of the outer cylinder and the outside circumferential surface of the inner cylinder toward the other to compress the elastic member,
wherein the protruding portion compresses the elastic member such that an elastic force of the elastic member in a vertical direction is greater than an elastic force of the elastic member in a side direction.

* * * * *